United States Patent [19]
Numako et al.

[11] Patent Number: 4,967,218
[45] Date of Patent: Oct. 30, 1990

[54] LENS DRIVING MOTOR CONTROL APPARATUS

[75] Inventors: Norio Numako; Takeo Kobayashi, both of Tokyo, Japan

[73] Assignee: Asahi Kogaku Kogyo Kabushiki Kaisha, Tokyo, Japan

[21] Appl. No.: 442,433

[22] Filed: Nov. 24, 1989

Related U.S. Application Data

[63] Continuation of Ser. No. 302,200, Jan. 27, 1989, abandoned.

[30] Foreign Application Priority Data

Feb. 3, 1988 [JP] Japan ................................. 63-23548

[51] Int. Cl.⁵ ............................................. G03B 3/10
[52] U.S. Cl. ................................ 354/195.1; 354/400
[58] Field of Search ............................. 354/195.1, 400

[56] References Cited

U.S. PATENT DOCUMENTS 4,293,206 10/1981 Tokutomi et al. ..................... 354/25
4,508,443 4/1985 Matsuzaki et al. ................... 354/402

FOREIGN PATENT DOCUMENTS 3336265 4/1987 Fed. Rep. of Germany .
51-147041 11/1976 Japan .
59-107310 6/1984 Japan .
60-129717 7/1985 Japan .
60-225122 11/1985 Japan .
60-235125 11/1985 Japan .
62-264034 11/1987 Japan .

*Primary Examiner*—Michael L. Gellner
*Attorney, Agent, or Firm*—Sandler, Greenblum & Bernstein

[57] ABSTRACT

A lens driving motor control apparatus comprises a lens barrel which moves a photographing lens system in an optical axis direction, a lens driving motor for driving the lens barrel, a coding means on the lens barrel for coding the position of the lens barrel, a code reading means for reading the code signal of the coding means, a position controlling means for controlling the lens driving motor to control the stop position of the lens barrel in accordance with the code signal which is read by the code reading means, and an abnormal code processing means for controlling the position control means, so that when the code read by the code reading means is abnormal, the code signal is treated as not having been read.

26 Claims, 17 Drawing Sheets

| ZP 3210 | POS | POSITION OF CAM RING | NORMAL MODE SWITCHING | ZOOM DURING FORWARD ROTATION | ZOOM DURING REVERSING |
|---|---|---|---|---|---|
| 1110 | 0 | LOCK | □ ○ | ○ | ○ |
| 1010 | 1 |  |  | ▽ | △ |
| 1011 | 2 | $f_0$ | ○ | ○ |  |
| 1001 | 3 | $f_1$ |  |  |  |
| 0001 | 4 | $f_2$ |  |  |  |
| 0011 | 5 | $f_3$ |  | IMMEDIATELY STOP | △ ○ |
| 0010 | 6 | $f_4$ | □ □ | ▽ ○ |  |
| 0110 | 7 | $f_5$ |  |  |  |
| 0111 | 8 | $f_6$ |  |  |  |
| 0101 | 9 | $f_7$ |  | ○ | ○ |
| 0100 | A | $f_7$ |  | ▽ |  |
| 1100 | B |  |  |  | △ |
| 1101 | C | MACRO | ○ □ | ○ |  |

□ START POSITION

○ STOP POSITION

△▽ POSITION OF ZOOM LENS WHEN MODE SELECTOR SWITCH IS MOVED THE ZOOM POSITION DURING THE OPERATION OF ZOOM MOTOR.

F I G. 1 0

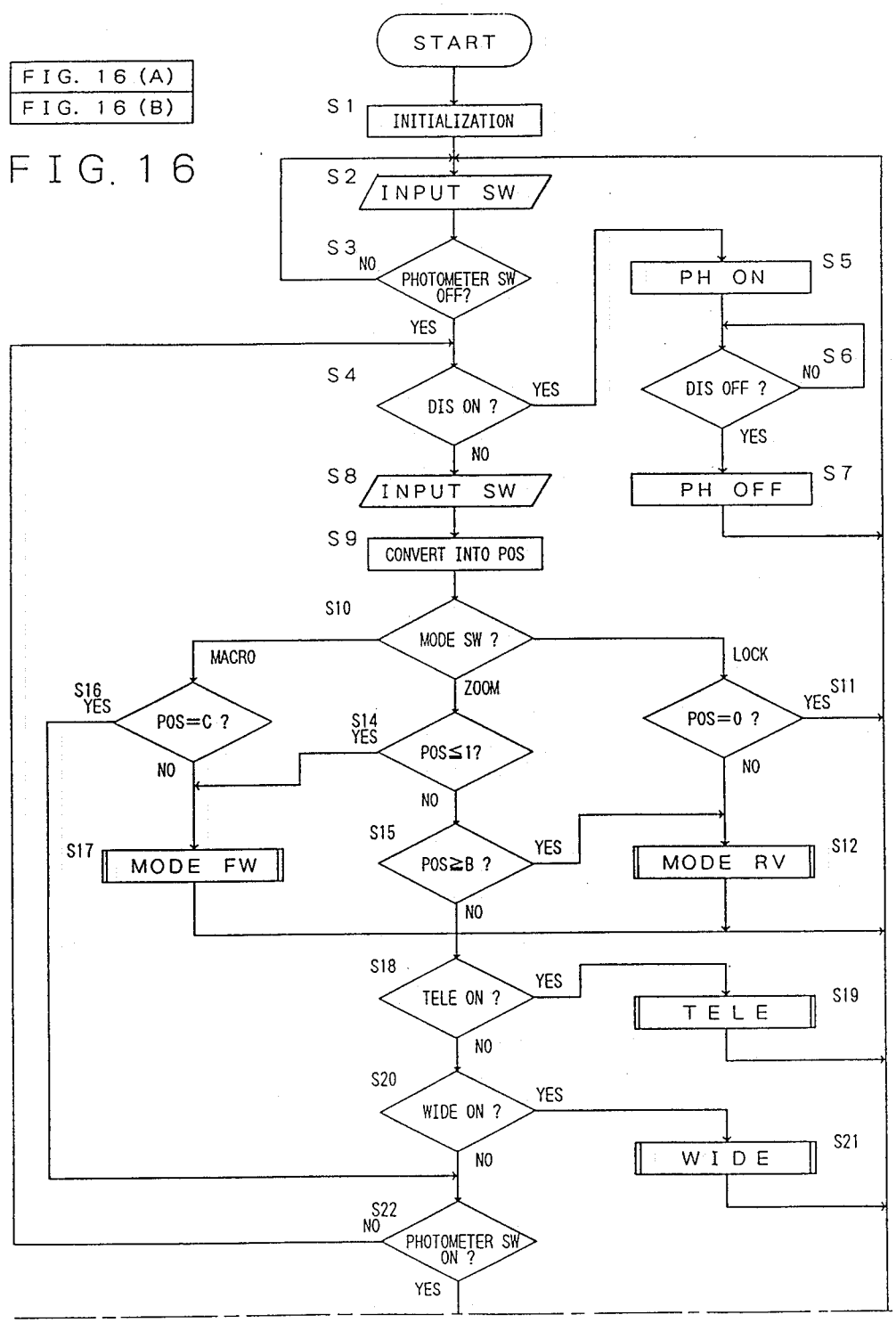

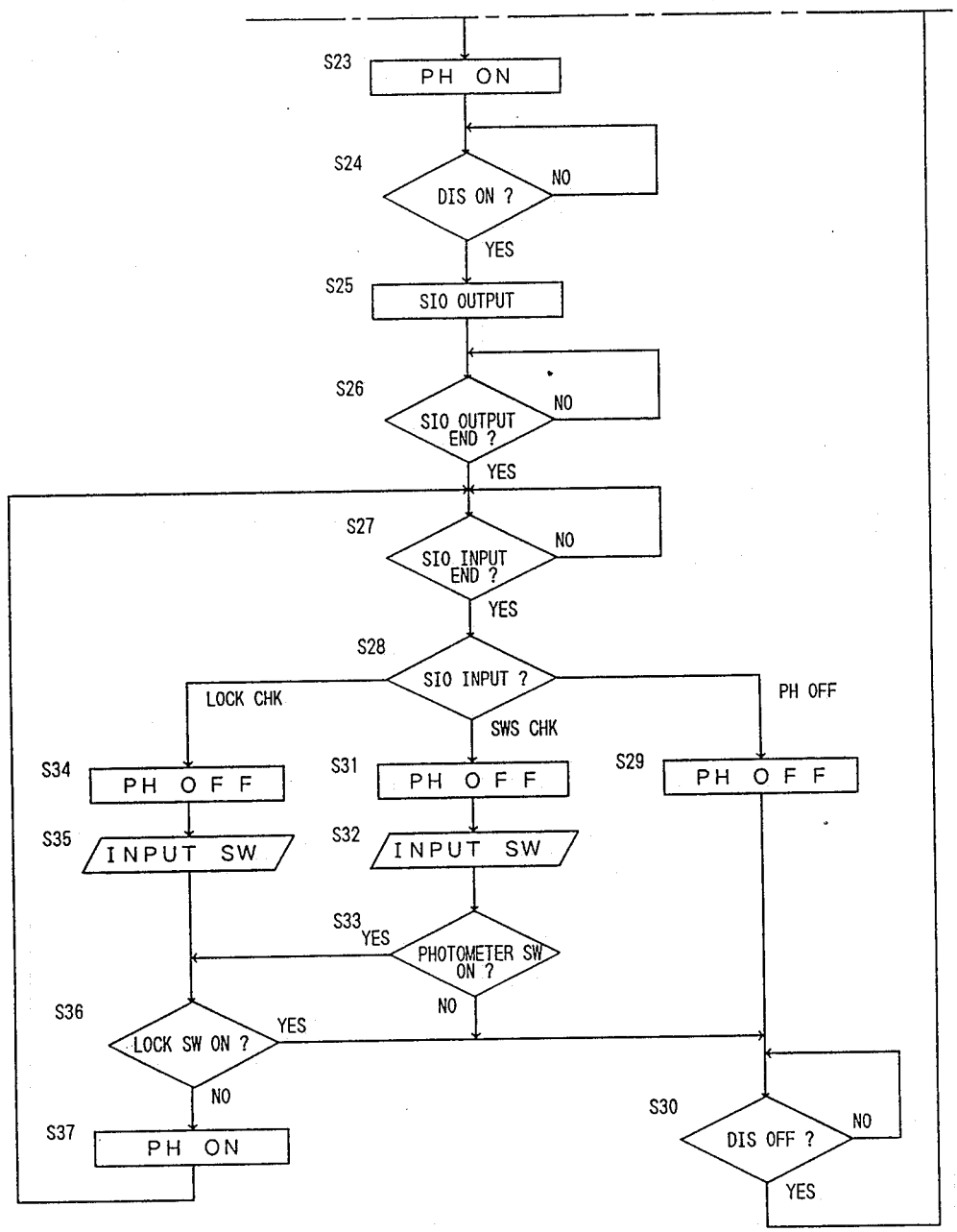
F I G. 1 6 (B)

LENS DRIVING MOTOR CONTROL APPARATUS

BACKGROUND OF THE INVENTION

1. Field of the Invention

The present invention relates to a motor control apparatus which detects a position of a lens barrel driven by a motor by reading the position which is coded to control a stop position of the lens barrel based on the codes, and more precisely it relates to a lens driving motor control apparatus which has means for compensating for an abnormal or unusual code.

2. Description of Related Art

Recently, various cameras having a powered zoom lens with a macro function have been developed. In a powered zoom lens, a lens barrel is rotated and/or moved in the optical axis direction by a lens driving motor to adjust the focus or vary the focal length.

Usually, the lens barrel has a code plate which codes the angular or rotational position and the axial position of the lens barrel. The codes are read by brushes to detect the position of the lens barrel by the code processing. The motor is driven in a direction in accordance with a distance signal from an automatic focusing apparatus or a zoom signal from a zoom operation switch, so that the motor is stopped when the code corresponding to the above-mentioned signals is read to stop the lens barrel at a desired position.

Usually, the code is represented by a four bit binary signal comprising combination of "1"'s and "0"'s. The four bit code can represent 16 kinds of information. However, generally speaking, three codes, i.e., "0000", "1111"and "1000", which tend to be confused with other codes are not used.

On the other hand, the four bit code is constructed, e.g., by a code plate which has a row of codes consisting of a conductive portion and a non-conductive portion in combination and brushes which are brought into contact with the row of codes. The code plate is applied onto an outer periphery of the lens barrel and the brushes are secured to an immovable portion of a camera so as to make contact with the code plate. When the motor is driven to move the lens barrel, the brushes come into contact with the code plate to read the code and thereby detect the position of the lens barrel.

When the brushes are in contact with the code plate, a mis-contact may occur, resulting in a reading error. As a result, the above-mentioned three codes which are not usually used, may be read.

If such a reading error occurs, the code is reread when the operation of the motor is stopped or when other operation is necessitated. However, when the contact between the code plate and the brushes is worsened, the possibility of a reading error is increased, so that the motor must often be stopped.

SUMMARY OF THE INVENTION

The primary object of the present invention is to provide a lens driving motor control apparatus in which a possible reading error can be corrected without stopping the motor.

To achieve the object mentioned above, according to the present invention, there is provided a lens driving motor control apparatus having a lens barrel which rotates or reciprocally moves to move a photographing lens system in an optical axis direction, a lens driving motor which drives the lens barrel, means on the lens barrel for coding the rotational or axial position of the lens barrel, means for reading the code of the coding means, a position controlling means for controlling the lens driving motor to control the stopping position of the lens barrel in accordance with the code read by the reading means, and means for controlling the position controlling means when the code read by the code reading means is incorrect or abnormal, the wrong or abnormal code being treated as not having been read.

With this arrangement, even if the code reading means fails to read a correct code, neither the motor neither stops nor a mis-operation of the camera takes place in response to the abnormal code.

BRIEF DESCRIPTION OF DRAWINGS

The present invention will be described below in detail with reference to the accompanying drawings, in which:

FIG. 10 is a diagram showing zoom codes of a code plate shown in FIG. 9 and stopping positions of a lens barrel;

FIGS. 16A, 16B, 17, 18, 19, 20 and 21 are flow charts of the operations of a camera to which the present invention is applied.

DETAILED DESCRIPTION OF PREFERRED EMBODIMENTS

The following discussion will be directed to the illustrated embodiments of the present invention.

Figure 1:
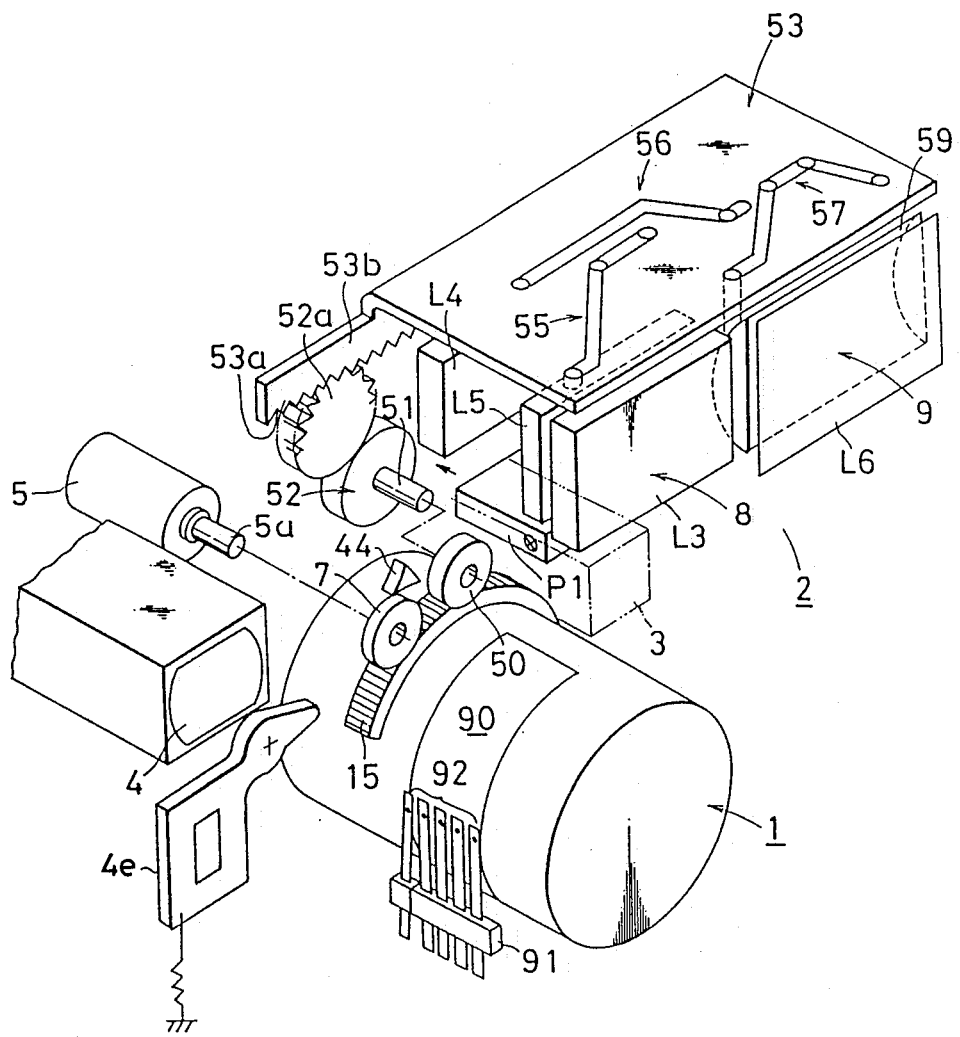
FIG. 1 is a schematic perspective view of main components of a lens shutter type of camera to which the present invention is applied.
Figure 2:
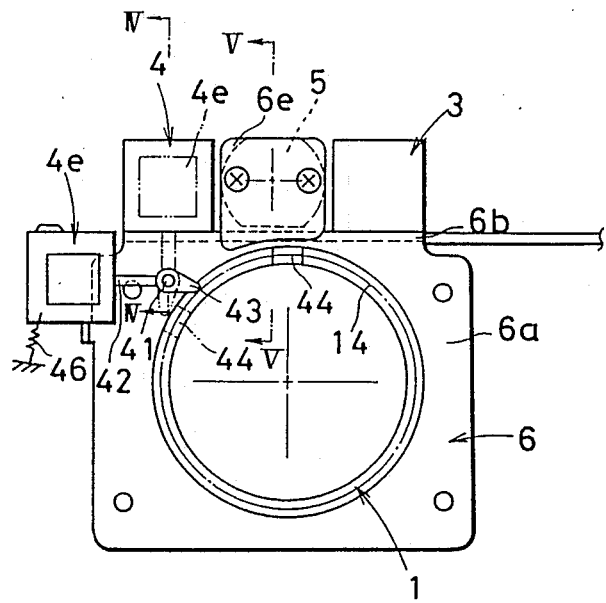
FIG. 2 is a front elevational view of a lens barrel block, an object distance measuring device having a light emitter and a light receiver, a close distance correcting optical element and a zoom motor shown in FIG. 1.
Figure 3:
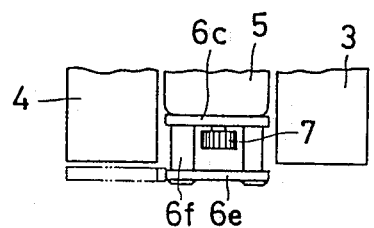
FIG. 3 is a plan view of FIG. 2.
Figure 4:
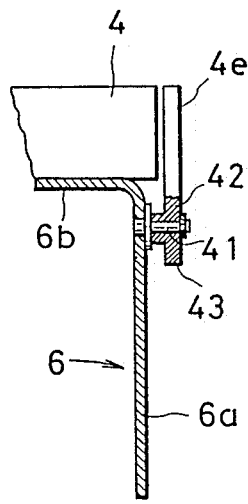
FIGS. 4 and 5 are sectional views taken along the lines IV—IV and V—V in FIG. 2, respectively.
Figure 5:
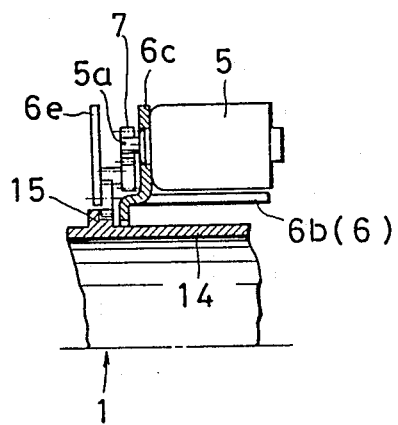

A lens shutter type camera to which the present invention is applied has a lens barrel block 1, a finder strobe block 2 which will be referred to as a finder block, of a zoom lens, a light emitter 3 and a light receiver 4 of an object distance measuring device (AF device), and a zoom motor 5, as generally shown in FIG. 1. These components are secured to a base plate 6 (FIGS. 2 and 5) which is an immovable part of a camera. Namely, the base plate 6 has a lens barrel supporting plate portion 6a normal to the optical axis, a horizontal supporting plate portion 6b which is bent at a right angle with respect to the lens barrel supporting plate portion 6a at an upper end of the latter and a motor supporting plate portion 6c perpendicular to the horizontal supporting plate portion 6b. The lens barrel block 1 is supported by the lens barrel supporting plate portion 6a.

The zoom motor 5, which is placed above the center of the lens barrel block 1, is secured to the motor supporting plate portion 6c. The light emitter 3 and the light receiver 4, which are secured to the horizontal supporting plate portion 6b, are located on the opposite sides of the zoom motor 5.

The finder block 2 is secured to the front right portion of the horizontal supporting plate portion 6b. A gear train supporting plate 6e is secured to the motor supporting plate portion 6c through a spacer 6f.

Figure 6:
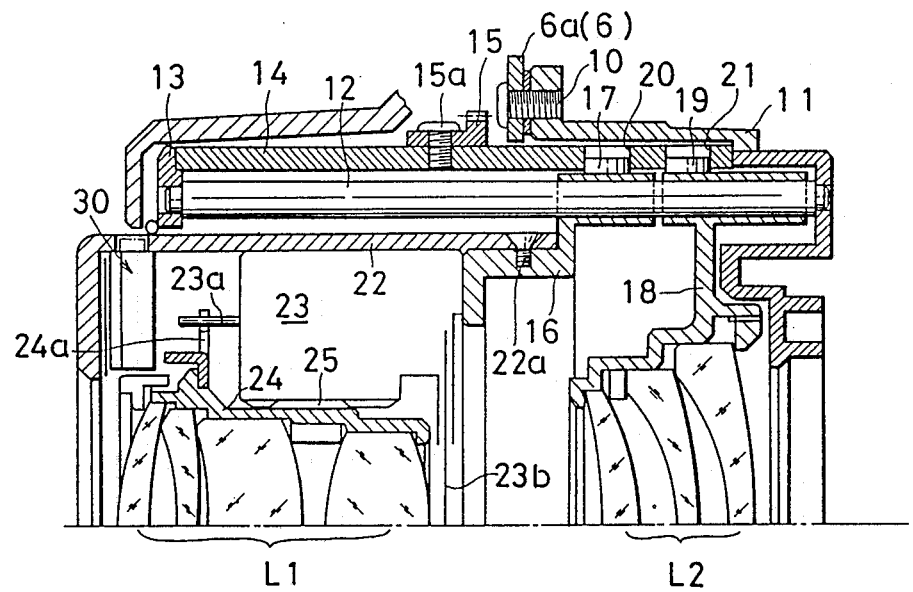
FIG. 6 is a longitudinal sectional view of a lens barrel block shown in FIG. 1.

A variable power lens group (front lens group $L_1$ and rear lens group $L_2$) for zooming of the lens barrel block 1 is driven by the zoom motor 5. The construction of the lens barrel block 1 will be described below with reference to FIGS. 6 to 8.

The lens barrel supporting plate portion 6a of the base plate 6 is secured to a rear securing plate 11 by set screws 10. The rear securing plate has four guide rods 12 secured thereto which extend in parallel with the optical axis to surround the same. A front securing plate 13 is secured to the front ends of the guide rods 12. The components mentioned above are main stationary elements of the lens barrel block 1.

Between the rear securing plate 11 and the front securing plate 13 is rotatably supported a cam ring 14 which is provided on its outer periphery with a gear 15 secured thereto by set screws 15a. The gear 15 is in mesh with a pinion 7 directly or through a gear train (not shown). The gear 15 can be a sector gear which covers the rotational displacement of the cam ring 14. The cam ring 14 has a zooming cam groove 20 for the front lens group and a zooming cam groove 21 for the rear lens group.

Figure 7:
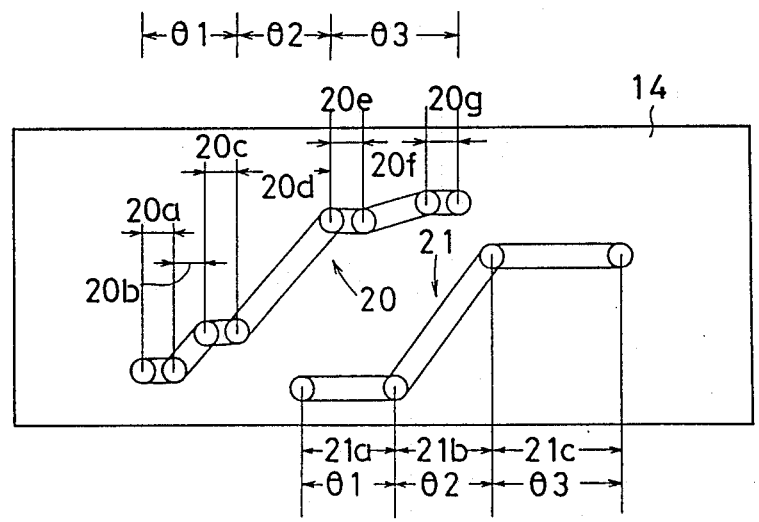
FIG. 7 is a developed view of cam grooves for front lens group and rear lens group, of a cam ring.
Figure 8:
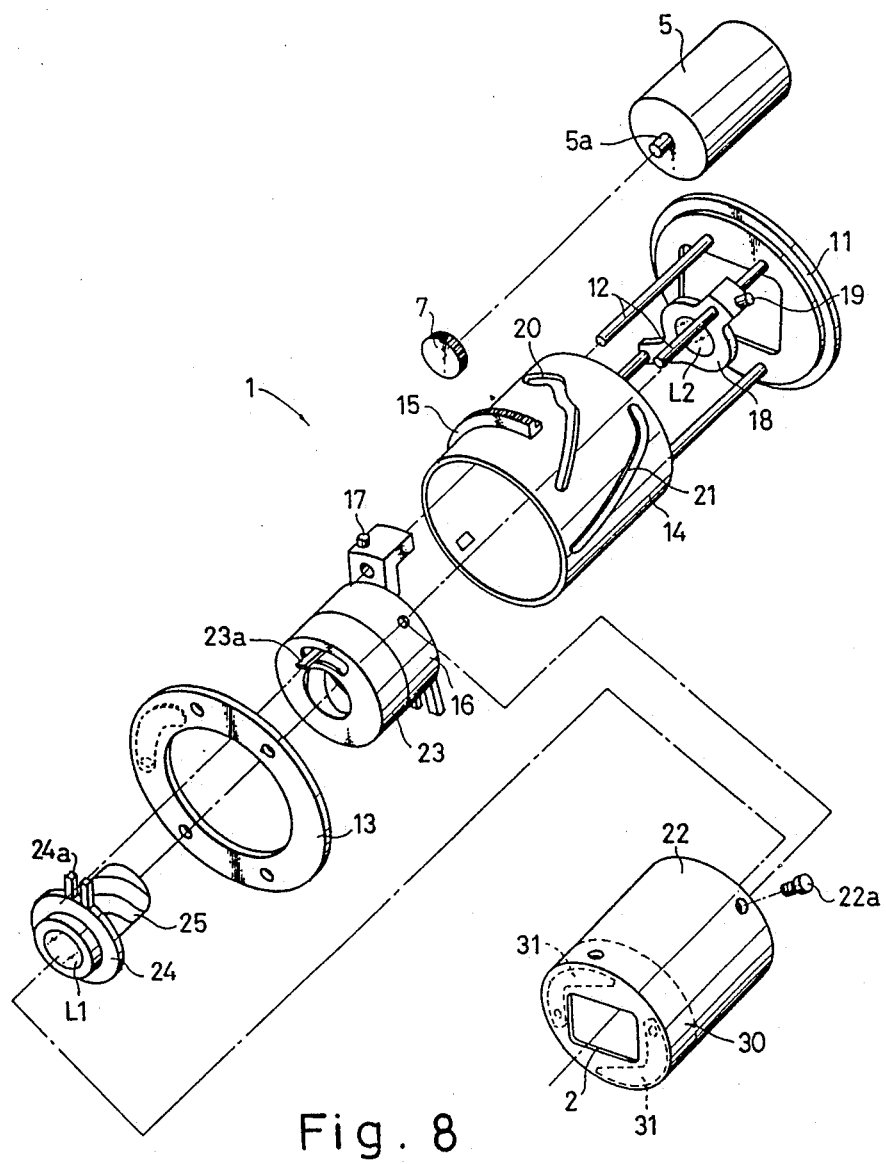
FIG. 8 is an exploded perspective view of a lens barrel block shown in FIG. 1.

FIG. 7 shows a developed view of the zooming cam grooves 20 and 21. The zooming cam groove 21 for the rear lens group has a wide angle extremity fixing section 21a, a variable power section (magnificaiton varying section) 21b and a telephoto extremity fixing section 21c. The zooming cam groove 20 for the front lens group has an opening and closing section 20a of the barrier block 30, a lens receiving section 20b, a wide angle extremity fixing section 20c, a variable power section 20d, a telephoto extremity fixing section 20e, a macro feeding section 20f and a macro extremity fixing section 20g.

The total angle $\theta 1$ of the rotational displacement of the opening and closing section 20a, the lens retracting section (lens receiving section) 20b, and the wide angle extremity fixing section 20c, of the zoomig cam groove 20 is identical to the angle $\theta 1$ of the wide angle extremity fixing section 21a of the zooming cam groove 21. The angle $\theta 2$ of the variable power section 20d is identical to the angle $\theta 2$ of the variable magnification (variable power) section 21b. Further, the total angle $\theta 3$ of the telephoto extremity fixing section 20e, the macro extremity fixing section 20g, and the macro feeding section 20f is equal to the angle $\theta 3$ of the telephoto extremity fixing section 21c. In the illustrated embodiment, the zooming range is 35 mm~70 mm.

In the zooming cam grooves 20 and 21 are fitted a roller 17 for a front group frame 16 and a roller 19 for a rear group frame 18, respectively. The front group frame 16 and the rear group frame 18 are movably guided by the guide rods 12. A lens frame 22 and a shutter block 23 are secured to the front group frame 16 by means of set screws 22a.

A front lens frame 24, which supports the front lens group L1, is engaged by the shutter block 23 by means of a helicoid 25. The front lens frame 24 has an arm 24a which comes into engagement with a lens feeding lever 23a of the shutter block 23, so that when the lens feeding lever 23a rotates in the circumferential direction to rotate the front lens frame 24, the front lens frame 24 moves in the optical axis direction with the help of the helicoid 25. The rear lens group L2 is directly secured to the rear group frame 18.

The shutter block 23 rotates the lens feeding lever 23a by a predetermined angular displacement, in accordance with a detection signal from the distance measuring device, by means of a pulse motor incorporated in the camera body to open shutter (sector) 23b which has been closed for a predetermined time, and then return the lens feeding lever 23a to its initial position after the shutter is closed again. This kind of shutter block 23 is well known, as disclosed in for example Japanese Unexamined Patent Publication (Kokai) Nos. 60-225122 and 60-235125. The present invention basically utilizes such a shutter block substantially without any modification.

The finder block 2 will be discussed below again with reference to FIG. 1. The finder block 2 includes a finder device 8 and a strobe device 9. Both the finder device 8 and the strobe device 9 move in association with the change of the focal length of the lens barrel block 1 so as to vary the finder field of view and the illumination angle (light intensity) of the strobe, respectively. The drive source of the finder and strobe operations is the zoom motor 5.

The gear 15 of the cam ring 14 is engaged by a pinion 50 that is different from the pinion 7. A shaft 51 of the pinion 50 extends toward the rear portion of the base 6 and is provided, on its rear end, with a reduction gear train 52. The reduction gear train 52 has a terminal gear 52a which is in mesh with a rack 53a of a cam plate 52. The cam plate 53 is slidable in the right and left hand directions (lateral directions) and has a downward bent portion 53b at its rear end. The rack 53a is formed on the lower end of the bent portion 53b of the cam plate 53. The reduction gear train 52 is adapted to reduce the rotation of the gear 15 in order to restrict the movement of the cam plate 53.

The cam plate 53 is provided with a variable power cam groove 55 for the finder device 8, a parallax correction cam groove 56, and a strobe cam groove 57 of the strobe device 9.

The lens system of the finder device 8 comprises a subject lens group L3, an eye-piece lens group L4, a movable variable power lens group L5, and a deflection prism P1 used for a macro mode.

The variable power lens group L5 makes the image picture size which varies in accordance with the variable power operation of the lens barrel block 1 coincident with the field of view by the finder device 8. The deflection prism P1 comes in the light path of the lens system only in the macro mode to adjust for the parallax of an image. Parallax problems are inevitable in a lens shutter type camera and increase as an object to be photographed comes closer. Accordingly, a large parallax can be caused at the macro mode. To solve the problem of a large parallax at the macro mode, the deflection prism P1 is provided in the present invention, which is in the form of a wedge with a thick lower end and a thinner upper end. The deflection prism P1, when located in the light path, deflects the rays of light downward to take a picture of the object closer to the camera.

The strobe device 9 restricts the illumination angle as the focal length of the photographing lens is large, namely as the lens is moved forward, and increases the illumination angle at the macro mode to decrease the quantity of light to the object. In the illustrated embodiment, the strobe device 9 has a fixed Fresnel lens L6 and a movable concave reflector (reflecting shade) 59 with a xenon lamp 58 which can be moved in the optical axis direction.

The following discussion will be addressed to the control system of the lens shutter type of camera to which the present invention is applied.

In this camera, information, such as a change of focal length of the zoom lens of the lens barrel block 1, a chage of open F number in accordance with the change of focal length, a location of the lens at the wide angle extremity (WIDE), a location of the lens at the telephoto extremity (TELE), a location of the lens in the receiving position, and a macro photographing mode etc. are automatically detected to perform the necessary control. To detect the lens position, a code plate 90 is attached onto the outer periphery of the cam ring 14 of the lens barrel block 1, as schematically shown in FIG. 1. An immovable frame 91 provided outside the cam ring 14 has brushes 92 which are connected to the immovable frame 91 at the base ends thereof and which are brought into slide-contact with the code plate 90.

Figure 9:
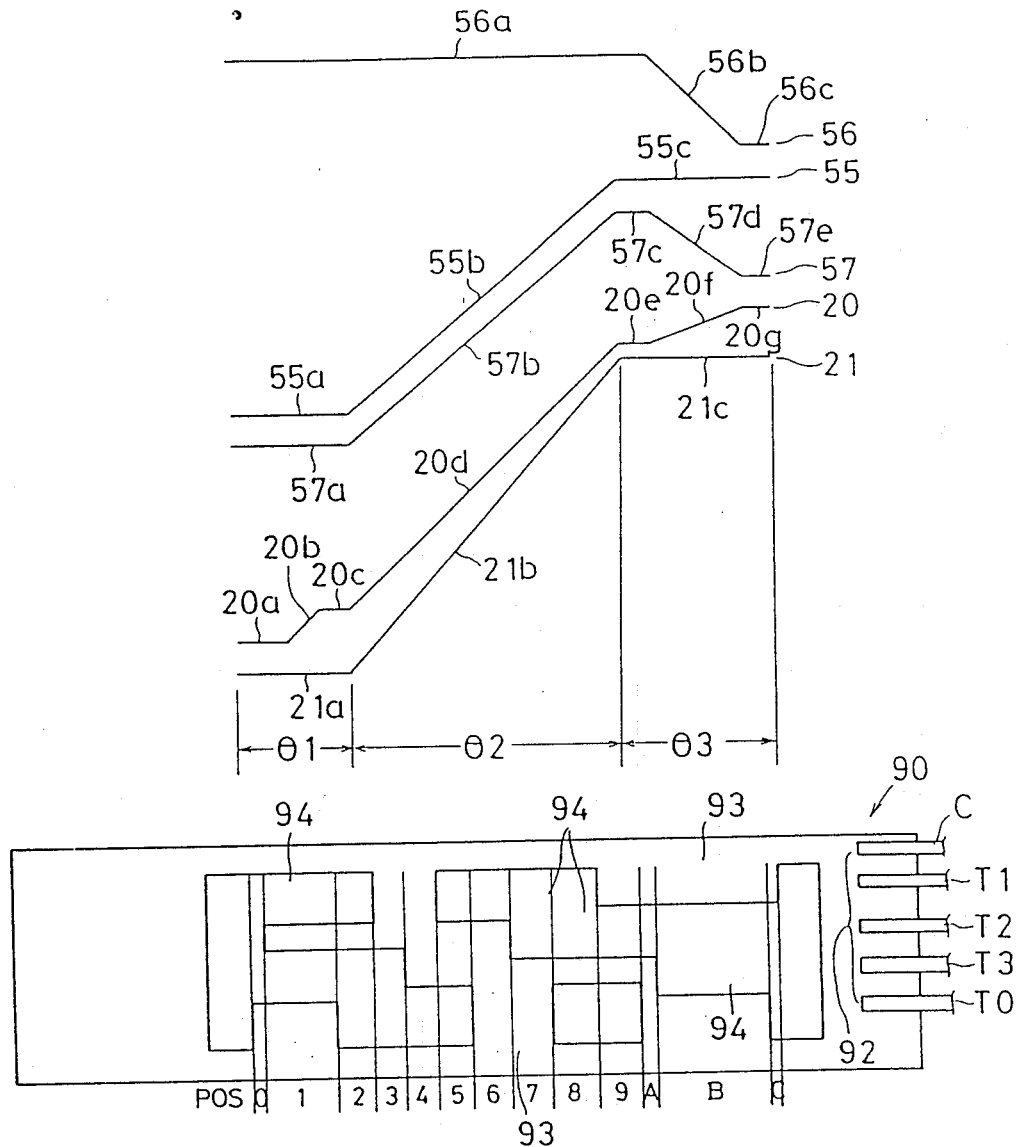
FIG. 9 is a schematic diagram showing a code plate, zoom codes of the code plate and stopping positions of a lens barrel.

FIG. 9 shows a developed view of the code plate 90, in which the cam profiles of the zooming cam grooves 20 and 21 and the cam grooves 55, 56 and 57 of the cam plate 53 are illustrated in the upper part of the drawing. The brushes 92 have a common terminal C and four contact terminals T0, T1, T2 and T3 which are labeled 0, 1, 2 and 3. When the terminals T0~T3 come into contact with conductive lands 93 of the code plate 90, a signal "0" is output, and when the terminals T0~T3 do not come into contact with the conductive lands 93, a signal "1" is output. The angular position of the cam ring 14 can be detected by the combination of the signals "0" and "1". Numeral 94 designates a dummy terminal provided between the conductive lands 93.

Four bits of information, T0, T1, T2 and T3 are supplied as zoom code data ZP0, ZP1, ZP2 and ZP3 of a zoom code encoder. FIG. 10 shows a combination of "0", and "1", of the zoom code data, by way of an example. In this example, 13 angular positions (POS) of the cam ring 14 are detected in the hexadecimal number, "0"~"9", "A", "B" and "C". Note that "0" designates the lock position (LOCK) and "C" the macro position (MACRO), and there are nine focal lengths f0~f7 and f7' between LOCK and MACRO. These angular positions (POS) are illustrated also in FIG. 9 below the code plate 9.

Note that three codes, of "0000", "1111" and "1000" which can be easily confused, as mentioned before, are not used in the above-mentioned combination of four bits. If these codes appear, they are treated as POS=F.

Figure 11:
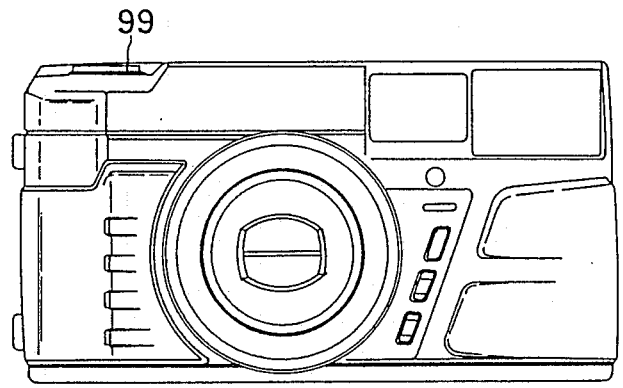
FIGS. 11, 12 and 13 are front elevational view, rear elevational view and plan view of a camera to which the present invention is applied for showing an arrangement of operational switches, respectively.
Figure 12:
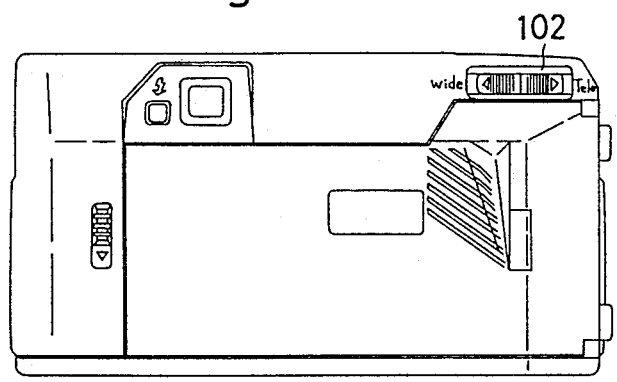
Figure 13:
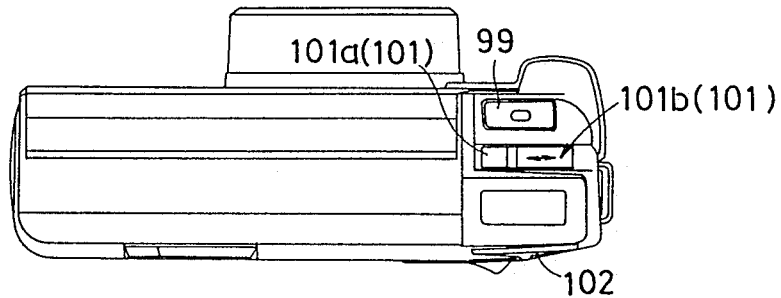

The control of the rotation of the cam ring 14 is carried out by a mode selection switch 101 and a zoom switch 102. FIGS. 11 to 13 show one example of an arrangement of the switches 101 and 102 provide on the camera body. Numeral 99 in FIGS. 11 and 13 designates a release button which turns a photometer (light detecting device) switch 103 (FIG. 14) ON when pushed a half step and which makes a release switch 123 (FIG. 14) when pushed by one step (i.e., a further half step).

The mode selection switch 101 is a transfer type of switch which can occupy three positions; LOCK, ZOOM and MACRO. When the mode selection switch 101 is in the LOCK position, neither releasing nor zooming can be effected. In the ZOOM position, both releasing and zooming can be effected. Furthermore, at the MACRO position, releasing can be effected, but no zooming is possible.

When the external force (i.e. photographer's finger) is released from the zoom switch 102, the latter occupies a neutral (OFF) position. The zoom switch 102 can be selectively and manually brought into WIDE and TELE in the opposite directions. When the zoom switch 102 is switched between WIDE and TELE, the zoom motor 5 can be selectively rotated in the forward and reverse directions.

Basically, the mode selection switch 101 and the zoom switch 102 actuate the camera to which the present invention is applied as follows.

(1) When the mode selection switch 101 is in the LOCK position:

The zoom motor 5 begins reversing and stops when the angular position of the cam ring 14, which will be referred to as POS, and which is detected by the code plate 90 and the brushes 92 in combination is "0" (FIGS. 9 and 10, the same below).

(2) When the mode selection switch 101 is in the MACRO position:

The zoom motor 5 begins rotating in the forward direction and stops when POS is "C".

(3) When the mode selection switch 101 is in the ZOOM position:

When the zoom switch 102 is made ON to occupy WIDE, the zoom motor 5 reverses during ON state of the zoom switch. When the zoom switch 102 is made Om to occupy TELE, the zoom motor 5 rotates in the forward direction. In this state, when POS is "A", the zoom motor 5 stops rotating. When the zoom switch is made ON on the WIDE side, the zoom motor 5 continues reversing for a certain short period of time after POS becomes "1". After that, the zoom motor 5 rotates in the forward direction until POS becomes "2" at which time the zoom motor 5 stops rotating.

If the zoom switch 102 is made OFF (neutral position) during the rotation of the zoom motor 5 in the forward direction, the zoom motor 5 immediately stops rotating. On the other hand, if the zoom switch 102 is made OFF (neutral position) during the low speed rotation of the zoom motor 5 in the reverse direction, the zoom motor 5 stops rotating after it rotates in the forward direction for a certain short period of time. The forward rotation for a certain short period of time contributes to the elimination of a possible backlash of the mechanism of the lens barrel block 1 and the finder block 2 and also to the absorption of a possible deviation in stop position between when the zoom motor is stopped during the occupation of WIDE and when the zoom motor is stopped during the occupation of TELE.

The whole control system of a camera including the above mentioned control will be described below in more detail.

Figure 14:
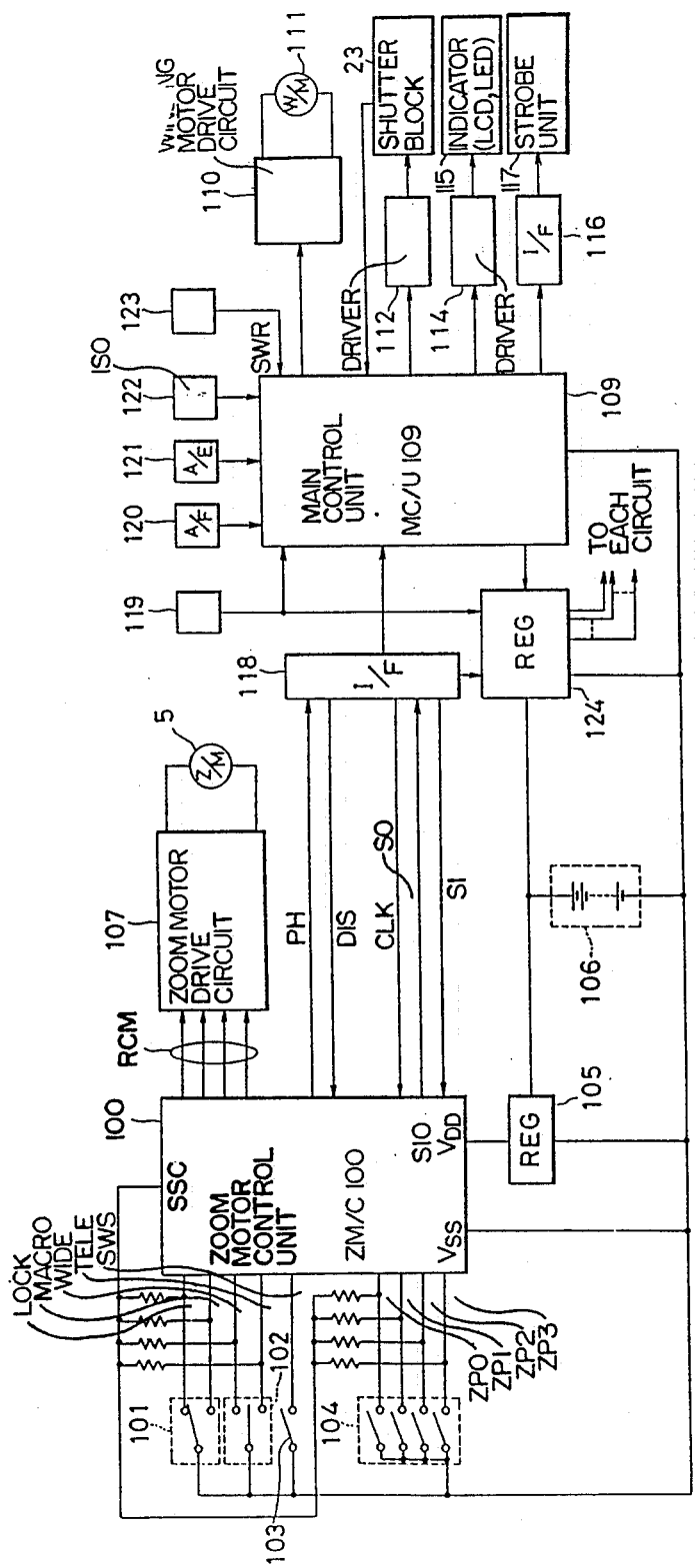
FIG. 14 is a block diagram of a control system of a camera to which the present invention is applied.

In FIG. 14, a zoom motor control unit 100 which will be referred to as ZM/C comprises a single chip micro computer in (which a program which will be described below) is stored in an internal program memory (ROM). When ZM/C 100 performs the program, the first and second driving means and stopping means according to the present invention can be operated.

To ZM/C 100 are input switch data from the mode selection switch 101, the zoom switch 102, the photometer switch 103 and a zoom encoder 104, which is represented by a switch equivalent circuit in FIG. 14. In addition, a zoom motor operation prohibiting signal DIS, a clock signal CLK for transferring serial data, and serial signal SI, which carries switch check/operation completion data, are inputted to the ZM/C 100 from a main control unit 109 (which will be referred to as MC/U), as will become more clear hereinafter.

ZM/C 100 outputs a rotation control command RCM to into a zoom motor drive circuit 107 which controls the zoom motor 5 and a power hold signal PH which makes the power source ON and OFF and a serial signal SO which carries the zoom code data ZP0~ZP3 from the zoom encoder 104 to MC/U 109.

The mode selection switch 101 generates two signals, LOCK and MACRO, shown in the following table 1 in accordance with the above mentioned three positions, LOCK, ZOOM and MACRO.

TABLE 1

| | NAME OF SIGNALS | |
|---|---|---|
| POSITION | LOCK | MACRO |
| LOCK | L(ON) | H(OFF) |
| ZOOM | H | H |
| MACRO | H | L |

The zoom switch 102 can occupy three positions of WIDE momentary, OFF and TELE momentary, as mentioned before.

The photometer switch 103 is actuated (operation signal SWS) by pushing release button 99 a half step to operate the object distance measuring device 120 (which has the light emitter 3 and the light receiver 4) and the photometer (A/E) 121.

The zoom encoder 104 detects the angular position of the cam ring 14 as the zoom code ZP0~ZP3 by the code plate 90 and the brushes 92 in combination and sends the detected signals to ZM/C 100.

In the switch scan control process which is done through the terminal SSC, the voltage "H" is supplied only when the input of the switches mentioned above is checked and a low voltage "L" is supplied at the time other than the above-mentioned checking to reduce the power consumption.

A regulator 105, which is activated by a battery 106, energizes the ZM/C 100 with a desired driving voltage.

Figure 15:
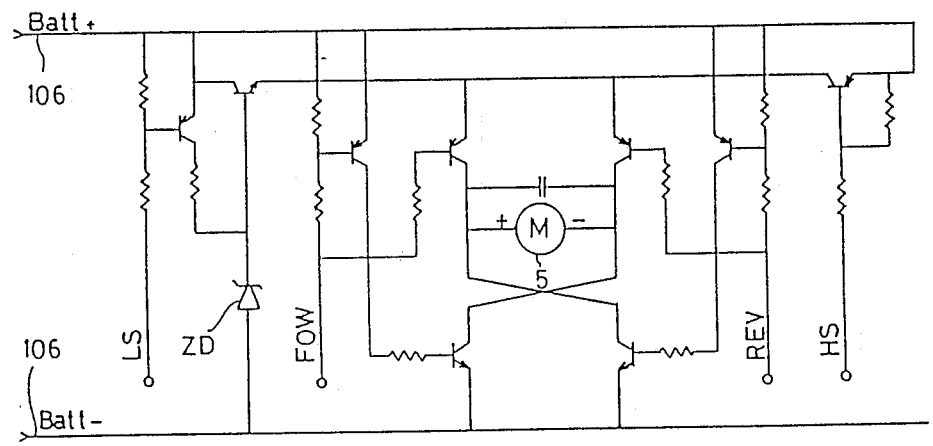
FIG. 15 is a diagram of a drive circuit of a zoom motor shown in FIG. 1.

A zoom-motor drive circuit 107 which comprises, e.g., as an electrical circuit as shown in FIG. 15, turns ON and OFF terminals HS, LS, FOW and REV, in accordance with 4 bit rotation control command RCM (FOWN, FOWP, REVN, REVP) from ZM/C 100, as shown in the tables 2 and 3, to control the rotation and stoppage of the zoom motor 5.

TABLE 2

| | (Forward Rotation) | | | |
|---|---|---|---|---|
| | FOWN | FOWP | REVN | REVP |
| 1 | | | | OPEN |
| 2 | ON | ON | | FORWARD ROTATION |
| 3 | | | | OPEN |
| 4 | ON | | ON | BRAKE |
| 5 | | | | OPEN |

TABLE 2-continued

| | (Forward Rotation) | | | |
|---|---|---|---|---|
| | FOWN | FOWP | REVN | REVP |
| | | | | (Blank is OFF.) |

TABLE 3

| | (Reverse Rotation) | | | |
|---|---|---|---|---|
| | FOWN | FOWP | REVN | REVP |
| 1 | | | | OPEN |
| 2 | | ON | ON | REVERSE ROTATION |
| 3 | | | | OPEN |
| 4 | ON | | ON | BRAKE |
| 5 | | | | OPEN |
| | | | | (Blank is OFF.) |

MC/U 109, which comprises, e.g., a single chip microcomputer, performs the program stored in the internal program memory (ROM) to carry out the following functions.

(1) Function of controlling the rotation of the winding motor 111 through the winding drive circuit 110:

(2) Function of controlling and driving the shutter block 23 through a driver 112:

(3) Function of controlling various indicators 115 through a driver 114:

(4) Function of controlling the strobe unit 117 (strobe circuit including a xenon light emitting tube 58) through an interface 116:

(5) Function of outputting the zoom motor operation prohibiting signal DIS through an interface 118:

(6) Function of outputting the clock CLK for serial transferring through the interface 118:

(7) Function of outputting the serial signal SI, carrying the switch check/operation completion data, through the interface 118: and, (8) Function of continuing the operation of the regulator 124.

To MC/U 109 are input switch data from a winding motor control switch 119, such as a film rewinding switch or a rear cover switch or the like, photometer data from the photometer 121, distance detection data from the object distance measuring device 120, film sensitivity data from a film sensitivity setting device or DX automatic reader (ISO) 122, and switch data SWR from the release switch 123.

The operation of the regulator 124 is controlled by MC/U 109. The operation (start/stop) of the regulator 124 is controlled by the presence of a power hold signal PH which is inputted thereto through the interface 118. Furthermore, the regulator 124 can be started by the switch data from the winding motor control switch 119. In operation, the regulator 124 supplies power to the necessary portions of the main control system other than the zoom control system.

The operation of the ZM/C 100 will be described below with reference to FIGS. 16 to 21, which show flow charts of the program stored in the ROM of the ZM/C 100.

The main operation of the apparatus will be discussed below with reference to FIGS. 16A and 16B which show main flow charts of the operation. A CPU in ZM/C 100 is supplied with electrical power through a regulator 105 by a battery 106 which is received in a battery case to carry out the initializing process at step S1.

After that, the switch scan control processs is performed at step S2. Then, after the states of the mode selection switch 101, the zoom switch 102, the photometer switch 103 and the zoom encoder 104 are input, whether the photometer switch 103 is made OFF in accordance with the input data is checked at step S3.

While the photometer switch 103 is made ON, the operations of steps S2 and S3 are repeated until the photometer switch 103 is made OFF. If the photometer switch 103 is made OFF, the control proceeds to step S4.

At step S4, whether the zoom motor operation prohibiting signal DIS from MC/U 109 is turned ON (e.g. "1") is checked. If DIS is ON, control proceeds to step S5, and if the DIS signal is OFF (e.g. "0"), control proceeds to step S8.

The DIS signal prohibits the winding motor 111 and the zoom motor 5 from simultaneously rotating to reduce the power consumption of the baterry 106. Namely, MC/U 109 makes the signal DIS ON only when MC/U 109 is operated by the winding motor control switch 119 to operate the winding motor 111.

When the DIS signal is ON, power hold signal PH is turned ON (e.g. "1") at step S5. The reason that the power hold signal PH is output at step S5 is that the winding motor 111 can be rotated by the operation of the MC/U 109, which is in turn operated by the winding motor control switch 119 under a special condition, i.e. only when the rotation is permitted by the power hold signal PH from the ZM/C 100, so that the zoom motor 5 and the winding motor 111 can not be rotated at the same time.

At step S6, the operation is stopped until the DIS signal from the MC/U 109 is made OFF, that is, until the control of rotation of the winding motor 111 by the MC/U 109 is completed. When the DIS signal is made OFF, the power hold signal PH is made OFF (e.g. "0") to make the regulator 124 OFF at step S7. After that, the control is returned to step S2. Note that even when the regulator 124 is made OFF, the supply of electrical power, for example, to the indicatior 115 can be partly continued.

When the DIS signal is OFF, the states of the switches are input at step S8, similarly to step S2. At step S9, the zoom codes ZP0~ZP3 from the zoom encoder 104 are converted to POS (FIGS. 9 and 10).

After conversion to POS, the position (mode) is detected (LOCK position, MACRO position or ZOOM position) at step S10 in accordance with data input at step S8. When the modes are LOCK, ZOOM and MACRO, the control proceeds to steps S11, S14 and S16, respectively.

When the mode is LOCK, the results of the conversion into POS at step S9 is POS=0 is checked at step S11 to see if POS=0. If POS=0, the control is returned to step S2, and if POS≠0, the control proceeds to step S12 to rotate the zoom motor 5 in the forward direction at high speed (see the rotation control command RCM in Table 2). After an RV sub-routine (and which will be discussed hereinafter) is performed at step S12, control is returned to step S2.

In case of the ZOOM mode, whether the result of conversion into POS satisfies POS≦1 is checked at step S14. If POS≦1, the control proceeds to step S17 to rotate the zoom motor 5 at a high speed in the forward direction (see the rotation control command RCM in Table 2). After a FW sub-routine (and which will be discussed below) is called and carried out at step S17, the control is returned to step If POS≧2, whether the result at step S9 satisfies POS≧B is checked at step S15. If POS≧B, the zoom motor 5 is reversed at high speed at step S12. After RV sub-routine (which will be described hereinafter) is called and carried out, control is returned to step S2.

If POS≦A, POS is judged to be 2≦POS≦A, and control proceeds to step S18.

In the case of the MACRO position, the result at step S9 is checked at step S16. If POS=C, the control is jumped to step S22. If POS≠C, the zoom motor 5 is rotated at a high speed in the forward direction at step S17 at which FW sub-routine (which will be explained below) is called and carried out. After that, control is returned to step S2.

At step S18, whether the zoom switch 102 is switched to TELE (TELE ON) in accordance with the date inputted at step S8 is checked. If TELE is ON, a TELE sub-routine (which will be described below) is called and carried out at step S19. After that, control is returned to step S2. If TELE is OFF, control proceeds to step S20.

At step S20, whether the zoom switch 102 is switched to WIDE (WIDE ON) in accordance with the data input at step S8 is checked. If WIDE is ON, a WIDE sub-routine (which will be described below) is called and carried out at step S21. After that, the control is returned to step S2. If WIDE is OFF, control proceeds to step S22.

At step S22, whether the photometer switch 103 is ON in accordance with the data input at step S8 is checked. If the photometer switch 103 is not ON, control is returned to step S4. If the photometer switch is ON, control proceeds to step S23.

The following discussion is directed to the operation of a camera to which the present invention is applied, including the operations of the RV sub-routine at step S12, the FW sub-routine at step A17, the TELE sub-routine at step S19 and the WIDE sub-routine at step S21.

Figure 17:
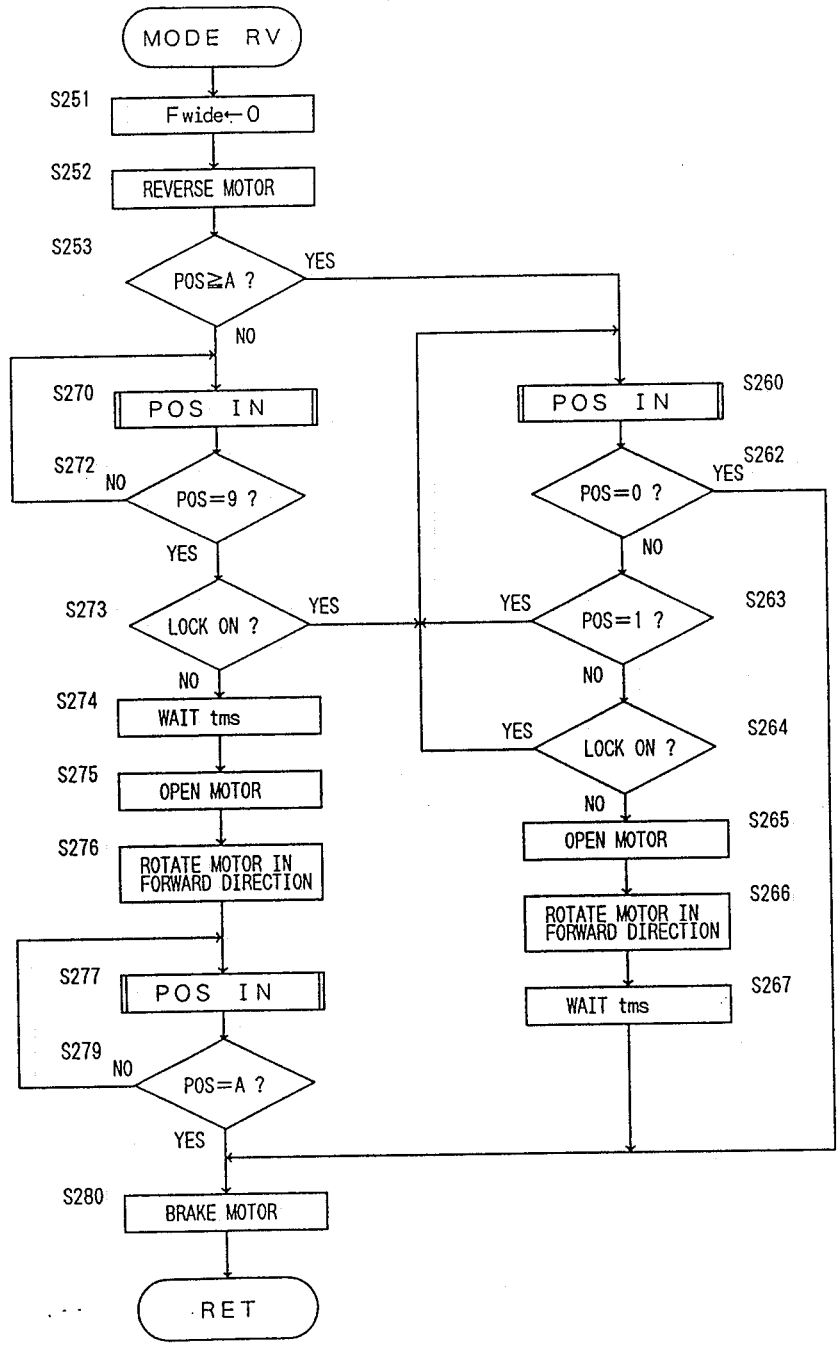

In FIG. 17, which shows a flow chart of the RV sub-routine, ZM/C 100 resets a WIDE extremity flag Fwide to "0" at step S251 so as to reverse the zoom motor 5 at step S252. Note that the WIDE extremity is POS=2; f0 in FIGS. 9 and 10. At step S253, whether POS≧A is checked. If POS<A, control proceeds to step S260, and if POS≧A, control proceeds to step S270.

Figure 19:
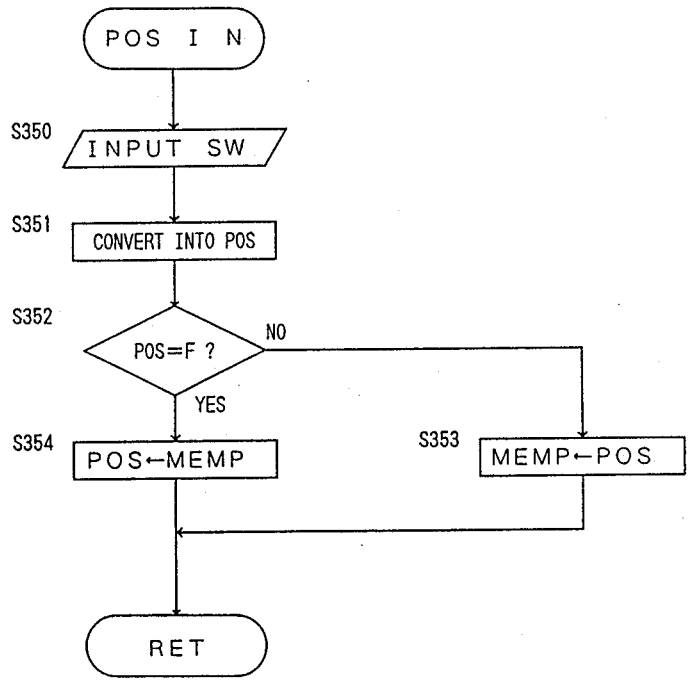

At steps S260 and S270, the POSIN sub-routine, shown in FIG. 19, is called and performed.

In the POSIN sub-routine, the scan control and the conversion into POS are carried out similarly to steps S8 and S9 in FIG. 16A.

At step S352, whether the result of conversion into POS is POS=F is checked. That is, whether the POS value is abnormal is checked. If POS≠F, which means "normal", the POS memory MEMP is rewritten into the normal POS value at step S353. After that, the control is returned to the RV sub-routine. If POS=F, which means "an abnormal condition", the result is ignored, so that the correct (i.e. normal) POS value which has been recorded or rewritten in the POS memory MEMP in the preceding process is read out at step S354. After that, control is returned to the RV sub-routine. That is, in the POSIN sub-routine, the code which is read out in the switch scan control process is converted into POS, and if the conversion result shows an "abnormal" value, the latter is ignored. In other words, the POSIN sub-routine performs the conversion into POS and the process of the abnormal code.

At step S262, the result of the conversion performed in the POSIN sub-routine is checked. If POS=0, i.e. the mode is in the LOCK position, control is jumped to step S280 to brake the zoom motor 5 to stop the same. After that, control is returned to step S2 in FIG. 16A.

If POS≠0, control proceeds to step S263 at which the result of conversion into POS is checked. If POS=1, control is returned to step S260, and if POS≠1, control proceeds to step S264.

At step S264, whether the mode selection switch 101 is in the LOCK position is checked. If mode is LOCK, the control is returned to step S260. If the mode is not LOCK, control proceeds to step S265.

At steps S265, S266 and S267, the zoom motor 5 is rotated in the forward direciton after the motor drive circuit 107 is opened (Table 3). Control proceeds to step S280 t msec thereafter, so that the zoom motor 5 is braked and stopped. After that, the control is returned to step S2 in FIG. 16A. The steps S265~S267 are for the removal of the backlash.

At step S272, whether the (normal) result of conversion into POS performed in the POSIN sub-routine is POS=9 is checked. If POS≠9, control is returned to step S270, and if POS=9, control proceeds to step S273.

At step S273, whether the mode selection switch 101 occupies the LOCK position is checked in a manner similar to step S264. If the mode is LOCK, control proceeds to step S260 and if the mode is not LOCK, control proceeds to step S274.

At steps S274, S275 and S276, the motor drive circuit 107 is opened after the lapse of t msec (Table 2), and then, the zoom motor 5 is rotated in the forward direction. After that, control proceeds to step S277 to call and perform the POSIN sub-routine to get a normal or correct POS conversion result. After that, control proceeds to step S279.

At step S277, whether POS=A (TELE extremity) is checked. If POS≠A, control is returned to step S277 and if POS=A, control proceeds to step S280 so as to brake the zoom motor 5 and thereby stop the same. After that, control is returned to step S2 in FIG. 16A.

The discussion will be continued below with the flow chart of the FW sub-routine shown in FIG. 18. When the FW sub-routine is called, the CPU of ZM/C 100 resets the WIDE extremity flag Fwide to "0" at step S301 so as to rotate the zoom motor 5 in the forward direction at step S302. Note that the WIDE extremity is POS=2; f0 in FIGS. 9 and 10. At step S303, whether POS≦1 is checked. If POS is not POS≦1, control proceeds to step S310, and if POS≦1, control proceeds to step S320.

At steps S310 and S320, the POSIN sub-routine shown in FIG. 19 is called and performed to obtain a normal or correct POS conversion result.

At step S312, the correct result of the conversion at step S310 is checked. If POS=C, i.e. if the mode is in the MACRO position, control is jumped to step S325 to brake the zoom motor 5 so as to stop the same. After that, control is returned to step S2 in FIG. 16A.

If POS≠C, control proceeds to step S313, at which result of conversion into POS is checked to be POS≧A. If POS≧A, control is returned to step S310, and if POS is not POS≧A, control proceeds to step S314.

At step S314, whether the mode selection switch 101 is in the MACRO position is checked. If mode is MACRO, control is returned to step S310. If the mode is not MACRO, control proceeds to step S325.

At step S322, the result of the conversion is checked to see if POS=2 (WIDE extremity). If POS≠2, control is returned to step S320. If POS=2, the control proceeds to step S323.

At step S323, whether the mode selection switch 101 occupies the MACRO position is checked in a manner similar to step S314. If the mode is MACRO, control proceeds to step S310 and if the mode is not MACRO, control proceeds to S324.

At step S324, the WIDE extremity flag Fwide is set to be "1", so that the zoom motor 5 can be braked and stopped at step S325. Then, control is returned to step S2 in FIG. 16A.

The foregoing is the operation of the zoom motor 5 when the mode switch 101 is in the LOCK position or MACRO position. In this operation, the zoom motor 5 rotates until the cam ring moves to a desired position.

Figure 20:
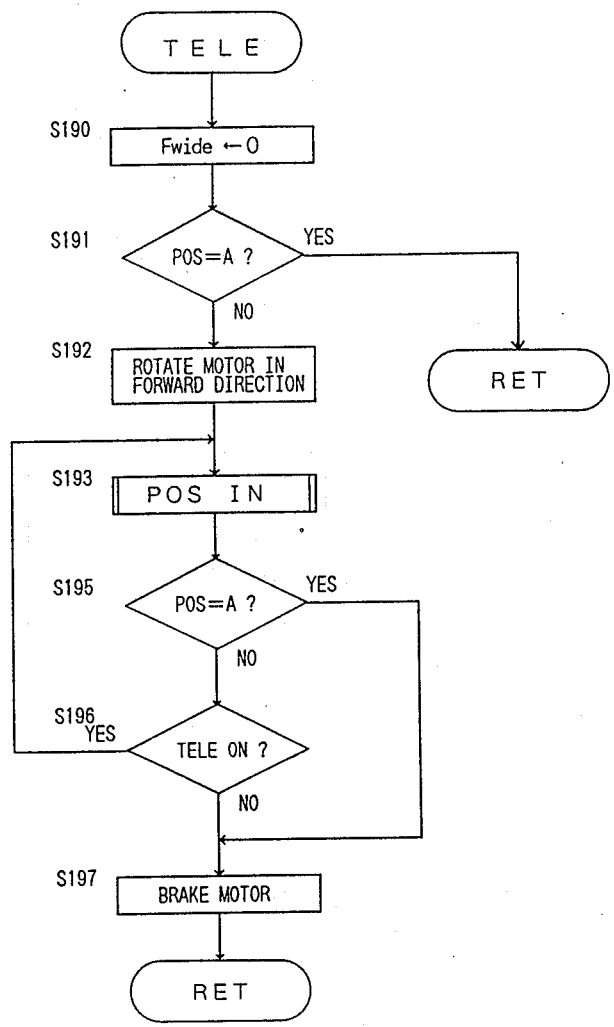

The following description will be addressed to the operation in which the zooming is effected toward TELE side, with reference to FIG. 20 which shows a flow chart of TELE sub-routine. When the TELE sub-routine is called, the CPU of ZM/C 100 resets the WIDE extremity flag Fwide to "0" at step S190.

At step S191, whether the result of conversion at step S9 is POS=A is checked. If POS=A, control is returned to step S2 in FIG. 16A and if POS≠A, i.e. if 2≦POS ≦9 in the illustrated embodiment, control proceeds to step S192 to rotate the zoom motor 5 in forward direction. After that, the control proceeds to step S193.

At step S193, the POSIN sub-routine shown in FIG. 19 is called and performed to obtain a normal POS value. At step S195, whether the result of the conversion at step S193 is POS=A (TELE extremity) is checked. If POS =A, control is skipped to step S197 to stop the zoom motor 5. After that, control is returned to step S2 in FIG. 16A.

If POS≠A, whether the zoom switch 102 is switched to TELE side (TELE ON) in accordance with the data input at step S193 is checked at step S196. If TELE is ON, control is returned to S193 and if TELE is OFF, the zoom motor 5 is stopped at step S197. After that, control is returned to step S2 in FIG. 16A.

The zooming operation toward the WIDE side will be explained below with reference to FIG. 21, which shows a flow chart of the WIDE sub-routine.

When the WIDE sub-routine is called, the CPU of ZM/C 100 checks at step S210 whether Fwide=1, i.e. whether the zoom motor 5 is stopped at the WIDE extremity. If Fwide=1, control is immediately returned to step S2 in FIG. 16A, and if Fwide ≠1, control proceeds to step S211.

At step S211, the zoom motor 5 is reversed at low speed, and then, the operation is stopped for a predetermined time of t msec to eliminate backlash. After the lapse of t msec, the POSIN sub-routine shown in FIG. 19 is called and performed at step S213 to obtain a normal POS value. After that, at step S215, whether POS=1 is checked. If POS=1, control proceeds to step S216 and if POS≠1, control proceeds to step S223.

At steps S216 and S217, the zoom motor 5 is rotated in the forward direction t msec thereafter. At step S218, the POSIN sub-routine in FIG. 19 is called and performed to get a normal POS value. At step S220, whether the result of conversion at step S218 is 2 (POS=2) is checked. If POS≠2, control is returned to step S218. If POS=2, the WIDE extremity flag Fwide is set to be "1" and the zoom motor 5 is braked to be stopped at steps S221 and S222, respectively. After that, control is returned to step S2.

If POS≠1 at step S215, control proceeds to step S223 to check whether the zoom switch 102 is still in the WIDE position (WIDE ON). If the zoom switch is WIDE, control is returned to step S213 and if WIDE is OFF, control proceeds to step S224.

At steps S224, S225 and S226, the zoom motor 5 is brakedand stopped after it is rotated in the forward direction for t msec to remove backlash. After that, control is returned to step S2.

The operation of steps S1~S22 in FIG. 16A and steps shown in FIGS. 17 to 21 will be explained below. Note that these steps are performed by the CPU in the ZM/C 100.

I. When the winding motor control switch 119, the release button 99 and the zoom switch 102 is not operated after the battery 106 is charged in the battery case:

(a) The case where the mode selection switch 101 is in LOCK;

The CPU in the ZM/C 100 performs the initialization at step S1 shown in FIG. 16A. After that, under the condition that the angular position of the cam ring 14 which determines the movement of the front lens group L1 and the rear lens group L2 is in the LOCK position, i.e. POS=0, the operation of the LOCK loop of S2-S4-S8-S11-S2 is repeated, so that no camera operation effected. In this moment, if the release button 99 is pushed to make the photometer switch 103 ON, the operations of steps S2 and S3 are repeated until the photometer switch 103 is made OFF. Namely, the operation of the release button 99 is nulled.

If the angular stop position of the cam ring 14 is not POS=0, control proceeds to step S12 from step S11, so that the cam ring 14 is brought to be POS=0 by the operations of the RV sub-routine in FIG. 17. Consequently, control is returned to step S2.

Note that CPU of ZM/C 100 repeats the operation of the LOCK loop of S4-S8-S11-S4, provided that no camera operation is done, after control is returned to step S2.

(b) The case where the mode selection switch 101 is switched to ZOOM from LOCK;

CPU of ZM/C 100 performs the operation in step S14 through the above-mentioned LOCK loop. In this moment, since POS=0, control proceeds to step S17 from step S15. Namely, the FW sub-routine shown in FIG. 18 is performed. At step S302, the zoom motor 5 is rotated in the forward direction. After that, control proceeds to step S320 through step S303. After that, the operations in the POS check loop of step S320 (POSIN sub-routine in FIG. 19)-S322-S320 are repeated until POS=2.

When POS=2, control proceeds to step S323, so that the zoom motor 5 is rotated at step S325 through step S324 under the condition that the mode selection switch 101 in not switched to MACRO. After that, control is returned to step S2 in FIG. 16A. In this case, the angular stop position of the cam ring 14 is the WIDE extremity (POS=2), in which the focal length is f0 as shown in FIG. 10. Note that the operations of the ZOOM loop of S4-S8-S10-S14-S15-S18-S20-S22-S4 are repeated after control is returned to step S2, so long as no camera operation is done.

(c) The case where the mode selection switch 101 is switched to MACRO from LOCK or ZOOM when the cam ring 14 is stopped at LOCK (POS=0) or at WIDE extremity (POS=2);

In the CPU of ZM/C 100, the operations are transferred to step S16 from step S10 of the above-mentioned zoom loop. In this case, since POS≦9, the operation (S17) in the FW sub-routine shown in FIG. 18 is performed. Namely, the zoom motor 5 is rotated in the forward direction at step S302 and the following operations are effected:

When the stop position of the cam ring 14 is POS≦1, the control proceeds to S320 from S303, so that the operations in the POS check loop of S320 (POSIN sub-routine in FIG. 19)-S322-S320 are repeated until POS=2.

When POS=2, control proceeds to step S310 under the condition that the MACRO position of the mode selection switch 101 is checked at step S323. The subsequent operations are similar to those in the case where the stop position of the cam ring 14 is POS≧2.

When the stop angular position of the cam ring 14 is POS≧2, control proceeds to S310 from S303, so that the operations in the POS check loop of steps S310 (POSIN sub-routine in FIG. 19)-S312-S313-S314-S310 are repeated until POS=C. This loop operation is repeated until POS≧A, provided that the MACRO position of the mode selection switch 101 is detected at step S314.

When POS≧A, the operations of the POS check loop of S310 (POSIN sub-routine in FIG. 19)-S312-S313-S310 except for S314 are repeated until POS=C.

When POS=C, the zoom motor 5 is immediately stopped at step S325, so that the cam ring 14 is stopped at the MACRO position of POS=C. Thus, control is returned to step S2 in FIG. 16. After that, the operations of the MACRO loop of S4-S8-S10-S16-S22-S4 are repeated, provided that no camera operation is effected.

(d) The case where the mode selection switch 101 is switched from MACRO to ZOOM when the cam ring 14 is stopped at the MACRO position (POS=C);

In the CPU of ZM/C 100, control proceeds to S14 from S10 of MACRO loop mentioned above. In this operation, since POS=C, the control proceeds through S14 and S15 to S12, i.e. the RV sub-routine shown in FIG. 17, so that the zoom motor 5 is reversed at step S252. After that, control proceeds to steps S270 through S253 and then the operation of the POS check loop of steps S270 (POSIN sub-routine in FIG. 19)-S272-S270 are repeated until POS=9.

When POS=9, control proceeds to steps S273 from S272. After that, the zoom motor 5 is switched from reversing to a forward rotation at steps S275 and S276, after the lapse of t msec at step S274, provided that the mode selection switch 101 is not switched to LOCK, which can be checked at step 273. After that, the operation of the POS check loop of steps S277 (POSIN sub-routine in FIG. 19)-S272-S277 are repeated until POS=A.

When POS=A, the zoom motor 5 is stopped and the control is returned to step S2 to await a subsequent operation. Namely, the angular stop position of the cam ring 14 is the TELE extremity (POS=A) in which the focal length is f7' in FIG. 10.

Similarly to the above-mentioned case (b), the CPU of ZM/C 100 repeats the operations of the zoom loop under the condition that no camera operation is effected, and afterwards control is returned to step S2.

The operations of S274, S275 and S276 are necessitated for the following reason:

Namely, when the mode is switched from MACRO to ZOOM, the cam ring 14 is stopped as soon as it comes to POS=A from POS=9. If the zoom motor 5, which has been rotated in the reverse direction, is rotated in the forward direction to be stopped at POS=A immediately after the cam ring comes to POS=9 from POS=A, there is a possibility that the zoom motor 5 is stopped with a backlash of gears or the like in a drive transmission mechanism of the zoom motor 5. However, if the zoom motor 5 continues reversing for a period of t msec at POS=9, the physical displacement of travel of the cam ring to the position of POS=A is increased. Accordingly, if the direction of rotation of the zoom motor 5 is changed from reverse to forward after t msec, the possible backlash can be substantially completely eliminated when the cam ring is stopped at POS=A.

(e) The case where the mode selection switch 101 is switched from MACRO to LOCK when the cam ring 14 is stopped at the MACRO positions (POS=C);

Control proceeds to step S11 from step S10 of the above-mentioned MACRO loop. In the case of POS=C, control proceeds to step S12, i.e. the RV sub-routine shown in FIG. 17, as mentioned before. At step S252, the cam ring 14 is reversed to bring the cam ring 14 to the LOCK position POS=0). After that, control proceeds to step S270 through step S253, so that the operations of the POS check loop of steps S270 (POSIN sub-routine in FIG. 19)-S272-S270 are repeated until POS=9.

When POS=9, whether the mode selection switch 101 is in the LOCK position is checked at step S273, as described above. When the mode selection switch 101 is in the LOCK position, the control proceeds to step S260, so that the operations of the POS check loop of steps S260 (POSIN sub-routine in FIG. 19)-S262-S264-S260 are repeated until POS=0.

When POS=0, the zoom motor 5 is stopped at step S280, so that the cam ring 14 is stopped at the LOCK position of POS=0. Thus, control is returned to step S2 in FIG. 16A to perform the subsequent operations.

(f) The case where the mode selection switch 101 is switched from ZOOM to LOCK when the cam ring 14 is stopped at the zoom position (2≦POS≦A);

Control proceeds to step S11 from S10 of the above-mentioned MACRO loop. Since 2≦POS≦A, control proceeds to step S12, i.e. the RV sub-routine shown in FIG. 17, so that at step S252, the zoom motor 5 is reversed. After that, control proceeds to step S260 from step S253.

When POS=A, the control proceeds to step S260 through steps S270, S272 and S273. In the POS check loop of S260 (POSIN sub-routine in FIG. 19)-S262-S264-S260, whether the mode selection switch 101 is in the LOCK position is checked at step S264, so that if it is in the LOCK position, the operations are repeated until POS=0. When POS=0, control proceeds to step S280 from step S262 to stop the zoom motor 5 to thereby stop the cam ring 14 at POS=0. After that, control is returned to step S2, shown in FIG. 16A, to perform the subsequent operations.

Note that after control is returned to step S2, the CPU of ZM/C 100 repeats the operations of the LOCK loop of steps S4-S8-S11-S4, so long as no camera operation is effected.

(g) The case where the mode selection switch 101 is switched from ZOOM to MACRO when the cam ring 14 is stopped at the ZOOM position (2≦POS≦A);

The cam ring 14 is stopped at the MACRO position by the operations similar to those of case (c) above, where the angular stop position of the cam ring 14 is POS≧2 to repeat the operations of the MACRO loop under the condition that no other operation is effected.

Figure 18:
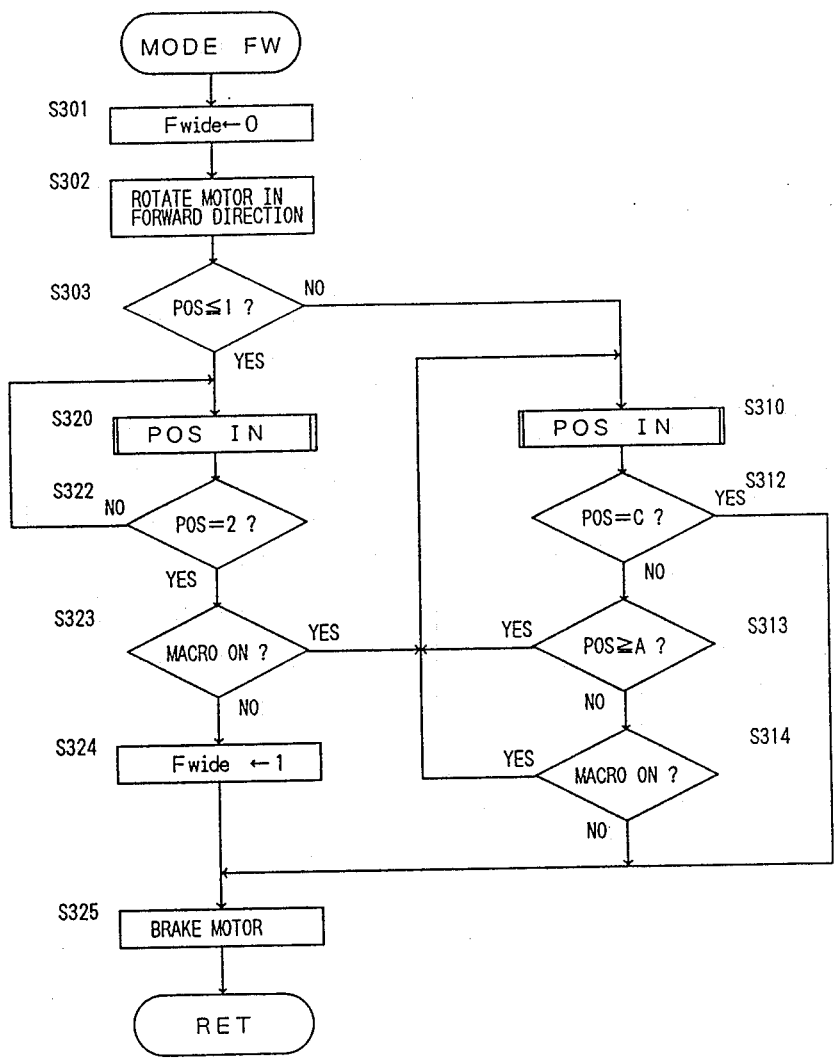

(h) The case where the mode selection switch 101 is switched to LOCK or ZOOM during the operation thereof at the MACRO position, as mentioned in the above (c);

At step S314 or S323 in FIG. 18, that the mode selection switch 101 is not in the MACRO position is checked. After that, the CPU of ZM/C 100 performs the following operations:

If the mode is switched at 0≦POS≦1, POS=2 is checked at step S323, and the zoom motor 5 is stopped to stop the cam ring 14 at the WIDE extremity at step S325 through step S324. After that, control is returned to step S2 to perform the subsequent operations.

If the mode is switched at 2≦POS≦9, the switching is checked at step S314, and the zoom motor 5 is immediately stopped at step S325. After that, the control is returned to step S2. If the mode selection switch 101 is switched to ZOOM at 2≦POS≦9, the angular stop position of the cam ring 14 is an optional position in which the focal length shown in FIG. 10 is any one of f0~f7.

If the mode is switched at A≦POS≦C, which is not checked, the operations of the loop of steps S310 (POSIN sub-routine in FIG. 19)-S312-S313-S310 are repeated until POS=C. When POS=C, control proceeds to S325 from S312 to stop the zoom motor 5 in order to stop the cam ring 14 at the MACRO position. After that, control is returned to step S2 to perform the subsequent operations.

(i) The case where the mode selection switch 101 is switched to MACRO or ZOOM during the LOCK operation in the above-mentioned (e) and (f);

At steps S264 and S273 in FIG. 17, that the mode selection switch 101 is switched to a position other than the LOCK position is checked. After that, the CPU of ZM/C 100 performs the following operations:

If the mode is switched to a position other than the LOCK position at POS≧A, POS=9 is checked at step S273, the operations of steps S274~S276 are carried out. After that, the operations of the POS check loop of steps S277 (POSIN sub-routine in FIG. 19)-S279-S277 are repeated until POS=A. When POS=A, the zoom motor 5 is stopped so as to stop the cam ring 14 at the TELE extremity at step S280. After that, control is returned to step S2 to perform the subsequent operations.

If the mode is switched to a position other than LOCK at 2≦POS≦9, which is checked at step S264, the operations for eliminating the backlash are immediately performed at steps S266 and S267, and zoom motor 5 is stopped at S280. After that, the control is returned to step S2. Namely, the angular stop position of the cam ring 14 at 2≦POS≦9 is an optional position in which the focal length shown in FIG. 10 in any one of f0~f7.

If the mode is switched to a position other than LOCK at POS≦1, which is not checked, the operations of the loop of steps S260 (POSIN sub-routine in FIG. 19)-S262-S263-S260 are repeated until POS=0. When POS=0, the zoom motor 5 is stopped, at step S280, so as to stop the cam ring 14 at the LOCK position. After that, control is returned to step S2 to perform the subsequent operations.

In summary, according to the illustrated embodiment, when the mode selection switch 101 starts the operation at the LOCK position or the MACRO position, even if the mode selection switch is switched to other position from LOCK or MACRO at $0 \leq POS \leq 2$ or $A \leq POS \leq C$, the initial operation continues to stop the cam ring at any one of POS=0, 2, A and C. After that, the operations of the desired mode switched from LOCK or MACRO can be commenced.

II. When the winding motor control switch 119 is actuated during the performance of the operations of the above-mentioned LOCK loop or ZOOM loop etc. by the CPU of ZM/C 100:

Since the zoom motor operation prohibiting signal DIS is made ON by the CPU of MC/U 109, the CPU of ZM/C 100 performs the operation of step S5 through step S4 shown in FIG. 16. At step S5, the power hold signal PH is outputted (ON) to permit MC/U 109 to rotate the winding motor 111, so that the CPU of MC/U 109 can commence the control of rotation of the winding motor 111.

When the zoom motor operation prohibiting signal DIS is made OFF, at the completion of the control of the winding motor 111 by the MC/U 109, control of the CPU of ZM/C 100 proceeds to step S7 from step S6 to make the power hold signal PH OFF. After that, control is returned to step S2.

Since the operations are branched from the above-mentioned LOCK, MACRO and ZOOM operation loops into steps S4~S7, not only the operation of the zoom motor 5 is prohibited during the operation of the winding motor 11, but also the operations of the photometer switch 103 and the release switch 123 are nulled.

III. When the zoom switch 102 is switched toward TELE side during the operation of the zoom loop by the CPU of ZM/C 100:

The control of the CPU of ZM/C 100 proceeds to step S19 from step S18, shown in FIG. 16A, to call and perform the TELE sub-routine shown in FIG. 20.

At step S190, the WIDE extremity flag Fwide is reset to "0". After that, if the angular stop position of the cam ring 14 is the TELE extremity of POS=A, no rotation of the zoom motor 5 is necessary, and accordingly, control is immediately returned to step S2, shown in FIG. 16A. On the other hand, if the angular stop position of the cam ring 14 is other than the TELE extremity, the zoom motor 5 is rotated in the forward direction at step S192, and then control proceeds to step S193. The control does not proceed until the cam ring 14 comes to POS=A, provided that the zoom switch 102 is not returned to the neutral position from the TELE side in the loop of steps S193 (POSIN sub-routine in FIG. 19)-S195-S196-S193. Note that when the TELE sub-routine is called, POS is $2 \leq POS \leq 9$. When POS=A, the zoom motor 5 is stopped at step S197 and then control is returned to step S2 in FIG. 16A.

As can be understood from the foregoing, when the zoom switch 102 is moved to the TELE side, the cam ring 14 is stopped at the TELE extremity, so long as the TELE operation is maintained. However, if the zoom switch 102 is released, to be returned to the neutral position on the way to the TELE extremity, control proceeds to step S197 from step S196 to immediately stop the zoom motor 5. Namely, by returning the zoom switch 102 to the neutral position from the TELE side at a desired timing, the cam ring 14 can be stopped at an optional position (optional focal length) corresponding to $2 \leq POS \leq 9$.

Figure 21:
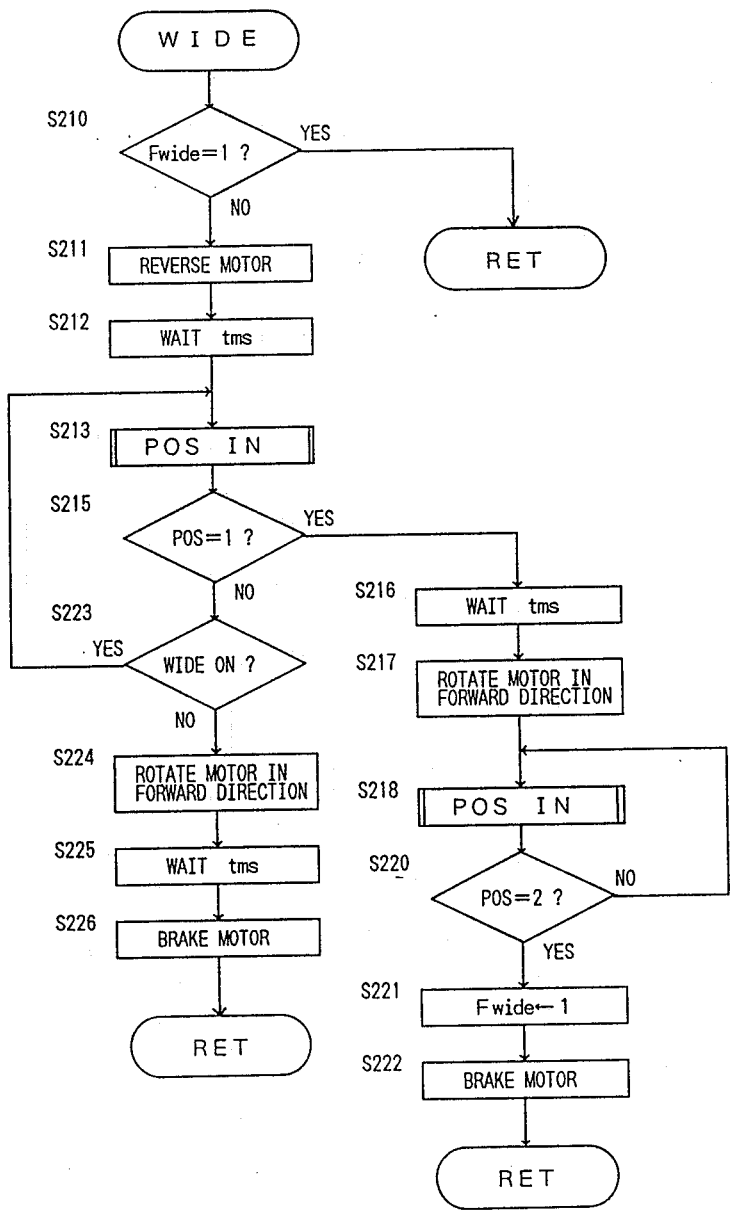
Figure 14:
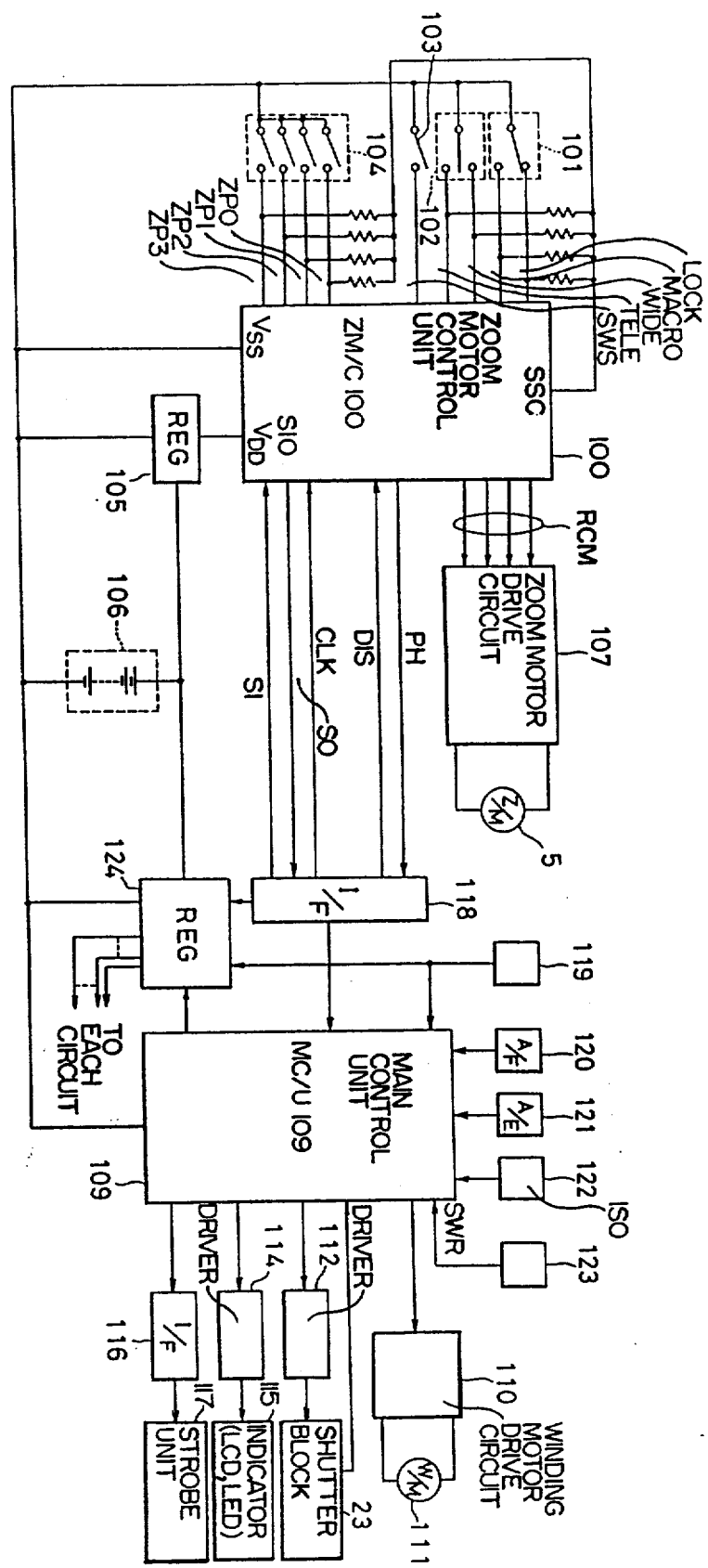

IV. When the zoom switch 102 is moved toward the WIDE side during the operation of the zoom loop by the CPU of ZM/C 100:

Control proceeds to step S21 from step S20 in FIG. 16A to call and perform the WIDE sub-routine shown in FIG. 21.

At step S210, whether the WIDE extremity flag Fwide is "1" is checked. If Fwide=1, the angular stop position of the the cam ring 14 is the WIDE extremity (POS=2), and accordingly no rotation of the zoom motor 5 is necessary. Therefore, control is immediately returned to step S2 in FIG. 16A. If Fwide=0, the zoom motor 5 is reversed at low speed at step S211.

The subsequent operation waits for t msec at step S212. This is because if the zoom switch 102 is returned to the neutral position as soon as the actuation of the zoom switch toward the WIDE side is completed, the displacement of reverse of the zoom motor 5 is uncertain, so that there is a possibility that the movement for eliminating the backlash mentioned above at steps S224 and S225 becomes larger than the necessary displacement.

After the completion of the operation at step S212, control waits until the angular stop position of the cam ring 14 becomes POS=1, provided that the zoom swith 102 is not returned to the neutral position from the WIDE side in the loop of steps S213 (POSIN sub-routine in FIG. 19)-S215-S223-S213.

When POS=1, the backlash eliminating operations are performed at steps S216 and S217, and the loop operation of S218 (POSIN sub-routine in FIG. 19)-S220-S218 is performed. The control does not proceed until POS=2.

When POS=2 (WIDE extremity), Fwide is set to be "1" at step S221 and then the zoom motor 5 is stopped. After that, control is returned to step S2 shown in FIG. 16A.

As can be seen from the above discussion, when the zoom switch 102 is moved to the WIDE side, the cam ring 14 is stopped at the WIDE extremity so long as the WIDE operation is maintained.

It goes without saying that if the zoom switch 102 is released to be returned to the neutral position on the way to the WIDE extremity, the operations for eliminating the backlash are performed at steps S224 and S225 through step S223 and then, the zoom motor 5 is stopped at step S226. Namely, by returning the zoom switch 102 to the neutral position form the WIDE side at a desired timing, the cam ring 14 can be stopped at an optional position (optional focal length) corresponding to $2 \leq POS \leq 9$.

During the above-mentioned operations, even if a code reading error occurs at the switch scan control process, so that the conversion result shows an abnormal value of POS=F, the abnormal POS value is ignored in the POSIN sub-routine of the POS check loop, and accordingly, the control proceeds with a normal value at the directly preceding operation. Therefore, the operation continues without stopping the zoom motor 5, resulting in a smooth photographing operation.

Finally, the operations subsequent to step S22 in FIG. 16A will be discussed below.

If the release button 99 is actuated to make the photometer switch 103 ON during the performance of the operations of the zoom loop by the CPU of ZM/C 100, control proceeds to step S23 from step S22 (provided that the winding motor control switch 119 is not made ON).

At step S23, the power hold signal PH is made ON to operate MC/U 109. Then, at step S24, the operation of MC/U 109 is confirmed by checking whether the zoom motor operation prohibiting signal DIS from MC/U 109 is made ON. After confirmation, the results (zoom code data) of conversion into POS at step S9 is set in the output register to effect a serial transfer of the zoom code data to MC/U 109. At the same time, the zoom code data are carried on the serial signal S10 synchronously with the clock CLK from MC/U 109 to serial-transfer the same to MC/U 109.

After that, at step S26, control does not proceed until the above-mentioned transfer operation is completed. Then, the control proceeds to step S27.

When the serial signal SI which carries thereon the switch check/operation completion data from MC/U 109 is input at step S27, the input data are checked at step S28.

If the input data is END (power hold OFF demand data) which designates the completion of the operation of MC/U 109, the control proceeds to step S29. If the input data is SWSCHK (photometer switch check data) or LOCKCHK (LOCK check data of mode selection switch), control proceeds to step S31 or S34.

At step S29, the power hold signal PH is made OFF, since the operation of MC/U 109 is completed. After that, at step S30, that the zoom motor operation prohibiting signal DIS from MC/U 109 IS MADE OFF is checked. Control is then returned to step S2.

The power hold signal PH is made OFF at step S31 to give information that the photometer switch 103 is made ON to MC/U 109. After that, the various switch data are input at step S32, in a manner similar to step S2.

Whether the photometer switch 103 is made ON in accordance with the input data at step S32 is checked at step S33. If the photometer switch 103 in not made ON, control is returned to step S2 after the zoom motor operation prohibiting signal DIS is made OFF at step S30.

When the photometer switch 103 is OFF, the operation at step S31 in which the power hold signal PH is made OFF becomes effective.

If the photometer switch 103 is ON, whether the mode selection switch 101 is switched to the LOCK position is checked at step S36 in accordance with the input data at step S32. If the mode is switched to LOCK, it is not necessary to detect that the photometer switch 103 is ON, and accordingly, control is returned to step S2 through step S30.

If the mode selection switch 101 in not switched to the LOCK position, the power hold signal PH is made ON again at step S37 and then, control is returned to step S27.

Whether the CPU of ZM/C 100 is commanded to give information whether the photometer switch 103 is made ON by MC/U 109, if the photometer switch 103 is ON, it is represented by making the power hold signal PH ON and OFF.

Finally, similarly to the photometer switch 103, information whether the mode selection switch 101 is switched to LOCK is given to MC/U 109 at steps S34~S37 and S30.

The zoom code data (conversion results into POS) which are transferred from ZM/C 100 to MC/U 109, and ON data of the photometer switch 103 are utilized in MC/U 109 as follows.

The zoom code data are used to control the shutter speed of the shutter block 23 as data representing an open F number which varies in accordance with the magnification. Furthermore, POS=C which represents the MACRO position can be used not only to illuminate the indicator in the finder in the indicating apparatus 115 to give a warning to a photographer, when the distance data detected by the object distance measuring device 120 is beyond the MACRO range, but also to control the operation of the release switch 123 to null the In addition to the foregoing, the ON data of the photometer switch 103 can be used to control the start of the operation of the photometer 121.

Although the regulator 105 is free to operate once the battery 106 is received in the battery case in the illustrated embodiment, it is also possible to provide a manual switch in a power supply line between the battery 106 and the regulator 105 in order to commence the operation of ZM/C 100 only when a photographer operates the manual switch.

It is understood that although the above description has been directed to a lens shutter type of camera having a multiple focus control zoom lens, the present invention is not limited thereto and can be applied to a lens shutter type camera having an automatic object distance measuring device to control the position of the lens in accordance with the object distance signal.

Furthermore, the rotatable actuator for moving the lens barrel can be replaced with a translation type actuator which reciprocally moves in the optical axis direction to move the lens barrel. In this alternative, the four bits of each code are located in the circumferential direction (perpendicular to the direction of movement of the lens barrel) of the lens barrel, so that the codes are along the direction of the movement of the lens barrel, and the brushes are circumferentially arranged accordingly.

As can be seen from the above discussion, according to the present invention, even if a reading error of the codes which represent the position of the lens barrel occurs, the error can be ignored by using a correct (or normal) code which has been stored in the immediately preceding step, so that no interruption of the operation of the zoom motor takes place, resulting in a smooth photographing operation.

We claim:

1. A lens driving motor control apparatus comprising a lens barrel which moves a photographing lens system in an optical axis direction, a lens driving motor for driving the lens barrel, means for coding the position of the lens barrel, means for reading a code signal of the coding means, a position controlling means for controlling the lens driving motor to control a position of the lens barrel in accordance with the code signal which is read by the code reading means, and an abnormal code processing means for controlling the position control means, so that when the code read by the code reading means is abnormal, the code signal is treated as not having been read.

2. A lens driving motor control apparatus according to claim 1, wherein the coding means is provided on the lens barrel.

3. A lens driving motor control apparatus according to claim 1, wherein said abnormal code processing means comprises means for nulling an abnormal code read by the code reading means.

4. A lens driving motor control apparatus according to claim 3, wherein when the code read by the code reading means is abnormal, the abnormal code processing means controls the position control means in accordance with a normal code which has been read at an immediately preceding operation.

5. A lens driving motor control apparatus according to claim 3, further comprising means for memorizing and rewriting the code signal which is read by the code reading means, when the code signal is normal.

6. A lens driving motor control apparatus according to claim 3, wherein said code reading means periodically reads the code signals to detect the position of the lens barrel.

7. A lens driving motor control apparatus according to claim 3, wherein the photographing lens system comprises a variable power lens group which can vary the focal length, and wherein the lens barrel can stop at more than one stop position within a focus adjustable zoom range to change its focal length in a stepwise fashion.

8. A lens driving motor control apparatus according to claim 7, wherein said lens barrel can move beyond the zoom range.

9. A lens driving motor control apparatus according to claim 8, wherein the photographing lens system can occupy a MACRO position beyond the zoom range.

10. A lens driving motor control apparatus according to claim 8, wherein the photographing lens system can occupy a lens retracted position in which the lens is accommodated in an inoperative state beyond the zoom range.

11. A lens driving motor control apparatus according to claim 8, wherein said photographing lens system can occupy a MACRO position beyond said zoom range.

12. A lens driving motor control apparatus according to claim 7, wherein said lens barrel comprises a cam ring which rotates to move the variable power lens system, so that the position control means can stop the cam ring at more than one stop position.

13. A lens driving motor control apparatus according to claim 12, wherein said coding means comprises a code plate which is applied to the outer periphery of the cam ring to code the stop position of the cam ring.

14. A lens driving motor control apparatus according to claim 13, wherein said coding means comprises electrical brushes which can be selectively brought into contact with the code plate to read the codes.

15. A lens driving motor control apparatus, comprising a lens barrel which moves a photographing lens system in an optical axis direction, a lens driving motor for driving said lens barrel, means for coding the position of the lens barrel, means for reading a code signal of the coding means, means for controlling a position of said lens driving motor in accordance with said code signal which is read by said code reading means, and means for processing an abnormal code for controlling said control means, so that when said code read by said code reading means is abnormal, said code signal is treated as not having been read.

16. A lens driving motor control apparatus according to claim 15, wherein said coding means is provided on said lens barrel.

17. A lens driving motor control apparatus according to claim 15, wherein said abnormal code processing means comprises means for nulling an abnormal code read by said code reading means.

18. A lens driving motor control apparatus according to claim 17, wherein when said code read by said code reading means is abnormal, said abnormal code processing means controls said position control means in accordance with a normal code which has been read at an immediately preceding operation.

19. A lens driving motor control apparatus according to claim 17, further comprising means for memorizing and rewriting said code signal which is read by said code reading means, when said code signal is normal.

20. A lens driving motor control apparatus according to claim 17, wherein said code reading means periodically reads said code signals to detect the position of said lens barrel.

21. A lens driving motor control apparatus according to claim 17, wherein said photographing lens system comprises a variable power lens group which can vary the focal length of said lens system, and wherein said lens barrel can stop at more than one stop position within a focus adjustable zoom range to change its focal length in a stepwise fashion.

22. A lens driving motor control apparatus according to claim 21, wherein said lens barrel can move beyond said zoom range.

23. A lens driving motor control apparatus according to claim 22, wherein said photographing lens system can occupy a lens retracted position in which said lens is accommodated in an inoperative state beyond said zoom range.

24. A lens driving motor control apparatus according to claim 21, wherein said lens barrel comprises a cam ring which rotates to move said variable power lens system, so that said position control means can stop said cam ring at more than one stop position.

25. A lens driving motor control apparatus according to claim 24, wherein said coding means comprises a code plate which is applied to the outer periphery of said cam ring to code said stop positions of said cam ring.

26. A lens driving motor control apparatus according to claim 25, wherein said coding means comprises electrical brushes which can be selectively brought into contact with said code plate to read said codes.

* * * * *

UNITED STATES PATENT AND TRADEMARK OFFICE
CERTIFICATE OF CORRECTION

Page 1 of 2

PATENT NO. : 4,967,218
DATED : October 30, 1990
INVENTOR(S) : N. NUMAKO et al.

It is certified that error appears in the above-indentified patent and that said Letters Patent is hereby corrected as shown below:

Drawings:
At sheet 9, Fig. 14, correct the legend identifying element 110 by inserting ---WINDING--- before "MOTOR DRIVE CIRCUIT", as shown on the attached drawing sheet.

Signed and Sealed this

Twenty-fourth Day of January, 1995

Attest:

BRUCE LEHMAN

*Attesting Officer*  *Commissioner of Patents and Trademarks*